US012761070B2

(12) United States Patent
Li et al.

(10) Patent No.: US 12,761,070 B2
(45) Date of Patent: Oct. 13, 2026

(54) OPTICAL FIBER WITH AN ACOUSTICALLY SENSITIVE FIBER BRAGG GRATING AND ULTRASOUND SENSOR INCLUDING THE SAME

(71) Applicant: DeepSight Technology, Inc., Santa Clara, CA (US)

(72) Inventors: Mucong Li, St. Louis, MO (US); Yihang Li, St. Louis, MO (US); Guangming Zhao, Beijing (CN); Jiangang Zhu, St. Louis, MO (US); Lan Yang, Clayton, MO (US); Linhua Xu, University City, MO (US)

(73) Assignee: DeepSight Technology, Inc., Santa Clara, CA (US)

( * ) Notice: Subject to any disclaimer, the term of this patent is extended or adjusted under 35 U.S.C. 154(b) by 285 days.

(21) Appl. No.: 18/749,712

(22) Filed: Jun. 21, 2024

(65) Prior Publication Data

US 2024/0426650 A1 Dec. 26, 2024

Related U.S. Application Data

(60) Provisional application No. 63/522,793, filed on Jun. 23, 2023.

(51) Int. Cl.

| | |
|---|---|
| ***G01H 9/00*** | (2006.01) |
| ***G01B 9/02*** | (2022.01) |
| ***G02B 6/02*** | (2006.01) |

(52) U.S. Cl.

CPC ......... *G01H 9/004* (2013.01); *G02B 6/02076* (2013.01)

(58) Field of Classification Search

CPC . G01B 9/02; G01H 9/00; G01H 9/004; G02B 6/00036; G02B 6/02076

See application file for complete search history.

(56) References Cited

U.S. PATENT DOCUMENTS

| | | | |
|---|---|---|---|
| 6,659,957 | B1 | 12/2003 | Vardi et al. |
| 7,245,789 | B2 | 7/2007 | Bates et al. |

(Continued)

FOREIGN PATENT DOCUMENTS

| | | | | | |
|---|---|---|---|---|---|
| CN | 110045457 | A | * | 7/2019 | ............. G01H 9/004 |
| EP | 2996606 | B1 | | 4/2019 | |
| JP | 2019109057 | A | * | 7/2019 | |

OTHER PUBLICATIONS

Machine Translation of CN-110045457-A (Year: 2019).*

(Continued)

*Primary Examiner* — Nguyen Q. Ha

(74) *Attorney, Agent, or Firm* — Nath, Goldberg & Meyer; Joshua B. Goldberg; Morgan D. Rosenberg

(57) ABSTRACT

The optical fiber with an acoustically sensitive fiber Bragg grating includes an optical fiber core with a pair of fiber Bragg gratings formed therein, such that each of the fiber Bragg gratings is spaced apart from the other. A cladding material is disposed on and surrounds at least a portion of the optical fiber core. The cladding material has at least one material property associated therewith, where the at least one material property may be a smaller Young's modulus than a Young's modulus of the optical fiber core, a larger photo-elastic coefficient than a photo-elastic coefficient of the optical fiber core, or combinations thereof. An ultrasound sensor includes at least one of the optical fibers embedded in a polymer layer, along with a backing layer and an acoustic matching layer.

45 Claims, 18 Drawing Sheets

(56) References Cited

U.S. PATENT DOCUMENTS

| | | | | |
|---|---|---|---|---|
| 8,560,048 | B2 | 10/2013 | Eberle et al. | |
| 9,529,148 | B2 * | 12/2016 | Kashiwagi | H01S 3/0672 |
| 10,363,015 | B2 | 7/2019 | Desjardins | |
| 2009/0074347 | A1 * | 3/2009 | Xia | G02B 6/02138 385/12 |
| 2020/0123052 | A1 * | 4/2020 | Schwartz | G01K 11/32 |
| 2024/0280746 | A1 * | 8/2024 | Takeuchi | C03C 25/1065 |

OTHER PUBLICATIONS

Machine Translation of JP-2019109057-A (Year: 2019).*

Gavrila, C., et al. "A Study of Optical Sensor Based on Fiber Bragg Grating (FBG) Using COMSOL Multiphysics." COMSOL 2009 International Conference. 2009.

Guggenheim, James A., et al. "Ultrasensitive plano-concave optical microresonators for ultrasound sensing." Nature Photonics 11.11 (2017): 714-719.

* cited by examiner

OPTICAL FIBER WITH AN ACOUSTICALLY SENSITIVE FIBER BRAGG GRATING AND ULTRASOUND SENSOR INCLUDING THE SAME

CROSS-REFERENCE TO RELATED APPLICATIONS

This application claims the benefit of U.S. Provisional Patent Application No. 63/522,793, filed on Jun. 23, 2023.

BACKGROUND OF THE INVENTION

Field of the Invention

The present disclosure relates to measurement and sensing, and particularly to ultrasound sensors with fiber Bragg gratings clad in acoustically sensitive materials.

Description of Related Art

Ultrasound sensing is useful for various applications, such as medical imaging and industrial imaging. For example, ultrasound imaging based on non-ionizing radiation is non-invasive and has remarkable penetration depth. Conventional ultrasound sensing uses non-optical acoustic energy generating (AEG) transducers, such as piezoelectric (PZT) transducers, single crystal material transducers, piezoelectric micromachined ultrasound transducers (PMUTs), and capacitive micromachined ultrasonic transducers (CMUTs) for transmitting and receiving ultrasonic waves. However, the detection sensitivity of non-optical transducers is a function of size, thereby limiting the suitability of non-optical transducers for size-constrained applications such as intravascular ultrasound devices. Furthermore, piezoelectric materials, such as lead-zirconate-titanate (PZT), polymer thick film (PTF), and polyvinylidene fluoride (PVDF), have several drawbacks. For example, piezoelectric materials have relatively high operation voltage requirements, a high electric field requirement (which may cause breakdown and failure), a non-linear response with high hysteresis, and a limited angle of detection. Accordingly, it may be desirable to provide improved devices and methods for ultrasound sensing.

Fiber Bragg gratings (FBGs) have found wide use in the field of sensors, since the Bragg wavelength, which is a known constant under stable conditions, can shift due to variations in temperature and strain. For constant temperatures, the measurement of Bragg wavelength shift yields a highly accurate measurement of applied strain. Given the accuracy of measurement, the strain can be relatively small, making FBGs highly effective for measuring very small vibrations. Determinations of sensitivity and responsiveness are ultimately limited by the choice of material used for the optical fiber core. Although silica, for example, has excellent optical transmission capabilities, it does not have equally exceptional acoustic sensitivity. Although numerous materials with superior acoustic sensitivity are known, such materials, on their own, typically would not make suitable replacements for silica and the like for optical fiber cores. There is a need to adapt conventional FBGs to take advantage of the acoustic sensitivity found in other materials.

Due to conventional manufacturing, which forms FBGs from a singular material, there is large constraint in optimizing the design for the grating structures and the material between them for specific applications, such as ultrasound sensing. For example, some polymers are very responsive to ultrasound induced pressure or strain, but design and manufacturing constraints prevent the creation of gratings in such polymeric materials. Thus, an optical fiber with an acoustically sensitive fiber Bragg grating and an ultrasound sensor including the same solving the aforementioned problems are desired.

SUMMARY OF THE INVENTION

The optical fiber with an acoustically sensitive fiber Bragg grating disclosed herein includes an optical fiber core with a pair of fiber Bragg gratings formed therein, such that each of the fiber Bragg gratings is spaced apart from the other. A cladding material is disposed on and surrounds at least a portion of the optical fiber core. The cladding material has at least one material property associated therewith, where the at least one material property may be a smaller Young's modulus than a Young's modulus of the optical fiber core, a larger photo-elastic coefficient than a photo-elastic coefficient of the optical fiber core, a lower refractive index (RI) than a refractive index of the optical fiber core, or combinations thereof. As a non-limiting example, if the optical fiber core is made from silica ($SiO_2$), the cladding material may be MY-133, a low refractive index optical coating manufactured by MY Polymers Ltd. of Israel, or BIO-133, also a low refractive index optical coating manufactured by MY Polymers Ltd. of Israel. As a further non-limiting example, if the core is silicon, which has a higher RI than silica, the cladding material may be polyvinylidene fluoride (PVDF), polystyrene (PS), parylene, benzocyclobutene (BCB), MY-133, or BIO-133. It should be understood that, as an alternative, one of the fiber Bragg gratings may be replaced by any other suitable type of reflector, such as, for example, a metal coating mirror, a dielectric coating mirror, a total internal reflection mirror, or the like.

In one embodiment, the optical fiber core may be tapered, such that a region of the optical fiber core between the pair of fiber Bragg gratings has a diameter which is less than a diameter of a remainder of the optical fiber core. The tapering may be defined by a recess formed in an outer surface of the optical fiber core, where the recess is aligned with the region of the optical fiber core between the pair of fiber Bragg gratings, and with the cladding material filling the recess. As a non-limiting example, where the optical fiber core is cylindrical, the recess may be an annular recess. As a further alternative, the features of the previous embodiments may be applied to an optical fiber core having only a single fiber Bragg grating formed therein.

In an alternative embodiment, a region between the pair of fiber Bragg gratings may be at least partially filled with the cladding material. In a manner similar to the previous embodiment, the region between the pair of fiber Bragg gratings which is at least partially filled with the cladding material may have a diameter which is less than a diameter of the optical fiber core. The tapering of this region may be defined by a recess formed in an outer portion of the region between the pair of fiber Bragg gratings which is at least partially filled with the cladding material, with a secondary cladding material filling the recess. The secondary cladding material may have a smaller refractive index than the refractive index of the cladding material.

In a further alternative embodiment, the region between the pair of fiber Bragg gratings which is at least partially filled with the cladding material may have a diameter which is greater than a diameter of the optical fiber core. In another alternative embodiment, the region between the pair of fiber Bragg gratings which is at least partially filled with the cladding material may be defined by a pair of convex surfaces respectively facing the pair of fiber Bragg gratings. In yet another alternative embodiment, the region of the optical fiber core between the pair of fiber Bragg gratings which is at least partially filled with the cladding material may be defined by a concave surface facing one of the fiber Bragg gratings and a convex surface facing another one of the fiber Bragg gratings. In still another alternative embodiment, the region of the optical fiber core between the pair of fiber Bragg gratings which is at least partially filled with the cladding material may be defined by a planar surface facing one of the fiber Bragg gratings and a convex surface facing another one of the fiber Bragg gratings.

An ultrasound sensor may include at least one of the optical fibers described above embedded in a polymer layer, along with a backing layer and an acoustic matching layer, such that the polymer layer and the at least one optical fiber are sandwiched between the backing layer and the acoustic matching layer. The polymer layer may be selected such that it has a smaller refractive index than the refractive index of the cladding material. An acoustic lens may be positioned adjacent to the acoustic matching layer.

Further, a light source may be provided for producing an initial light beam having a plurality of wavelengths associated therewith, and an optical circulator may be provided having first, second and third ports, where the first port is in optical communication with the light source. The ultrasound sensor may further include a first wavelength division multiplexing splitter in optical communication with the second port of the optical circulator for dividing the initial light beam into optical signals each having one of the wavelengths associated therewith.

In one embodiment, the at least one optical fiber is provided as a linear array of the optical fibers. In an alternative embodiment, the at least one optical fiber is provided as a cylindrically distributed array of the optical fibers within the polymer layer. As a further alternative, the cylindrically distributed array of the optical fibers may be circumferentially distributed.

The first wavelength division multiplexing splitter is in optical communication with the array of the optical fibers for respectively transmitting the optical signals thereto. Additionally, a wavelength division multiplexing combiner may be in optical communication with the array of the optical fibers for receiving sensed signals therefrom for combining the sensed signals into a sensed light beam. The wavelength division multiplexing combiner is in optical communication with the second port of the optical circulator. A second wavelength division multiplexing splitter may be in optical communication with the third port of the optical circulator for receiving the initial light beam and the sensed light beam and dividing each into individual wavelength components. A photodetector array may be in optical communication with the second wavelength division multiplexing splitter for receiving the individual wavelength components of the initial light beam and the sensed light beam, such that detected phase shifts therebetween are indicative of sensed acoustic signals.

In a further alternative embodiment, at least one piezoelectric or acoustic energy generating transducer may be positioned adjacent to the at least one optical fiber. As a further alternative, the at least one optical fiber may be provided as a cylindrically distributed array, and the at least one piezoelectric or acoustic energy generating transducer may be provided as an array thereof annularly surrounding the cylindrically distributed array of the optical fibers and the polymer layer.

In another alternative embodiment, at least one array of photoacoustic fiber bundles may be positioned adjacent to the at least one optical fiber. In still another alternative embodiment, an array of photoacoustic fiber bundles may be embedded in the polymer layer. As a further alternative, the at least one optical fiber may be provided as an array of the optical fibers, and the array of photoacoustic fiber bundles and the array of the optical fibers may each be cylindrically distributed within the polymer layer. As still a further alternative, the array of the optical fibers and the array of photoacoustic fiber bundles may each be circumferentially distributed.

It should be understood that the embodiments optical fibers with acoustically sensitive fiber Bragg gratings may also be realized as optical chips. In one embodiment, an optical chip with an acoustically sensitive fiber Bragg grating includes a substrate and an optically transparent layer formed on the substrate, where the optically transparent layer defines a core region, and where a fiber Bragg grating and a reflector are formed in the core region. As in the previous embodiments, the fiber Bragg grating and the reflector are spaced apart from one another and a cladding material is disposed on, and surrounds, at least a portion of the core region such that the core region is at least partially sandwiched between the cladding material and the substrate. As non-limiting examples, the reflector may be a mirror or another fiber Bragg grating.

The cladding material has at least one material property associated therewith, including a smaller Young's modulus than a Young's modulus of the core region, a larger photo-elastic coefficient than a photo-elastic coefficient of the core region, or combinations thereof. As non-limiting examples, the cladding material may be polyvinylidene fluoride, polystyrene, parylene, benzocyclobutene, or the like.

In an embodiment, a portion of the core region between the fiber Bragg grating and the reflector may have a width which is less than a width of a remainder of the core region. A recess may be formed in at least one outer edge of the core region, such that the recess is aligned with the portion of the core region between the fiber Bragg grating and the reflector. The cladding material at least partially fills the recess.

In a further embodiment, a region between the fiber Bragg grating and the reflector may be at least partially filled with the cladding material. The region between the fiber Bragg grating and the reflector which is at least partially filled with the cladding material may have a width which is less than a width of the core region. A recess may be formed in at least one outer edge of the region between the fiber Bragg grating and the reflector which is at least partially filled with the cladding material, and a secondary cladding material may fill the recess, where the secondary cladding material has a smaller refractive index than the refractive index of the cladding material.

Alternatively, the region between the fiber Bragg grating and the reflector which is at least partially filled with the cladding material may have a width which is greater than a width of the core region. As a further alternative, the region between the fiber Bragg grating and the reflector which is at least partially filled with the cladding material may be defined by a pair of convex surfaces respectively facing the fiber Bragg grating and the reflector. In another alternative embodiment, the region between the fiber Bragg grating and the reflector which is at least partially filled with the cladding material may be defined by a concave surface facing one of the fiber Bragg grating and the reflector and a convex surface facing the other of the fiber Bragg grating and the reflector. As a further alternative, the region between the fiber Bragg grating and the reflector which is at least partially filled with the cladding material may be defined by a planar surface facing one of the fiber Bragg grating and the reflector and a convex surface facing the other of the fiber Bragg grating and the reflector.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1A:
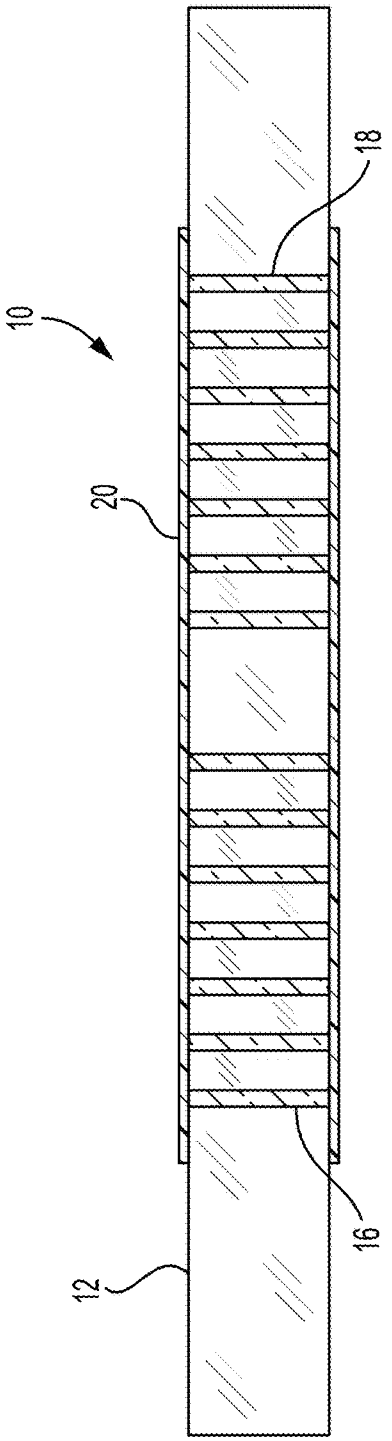
FIG. 1A shows a side view in section of an acoustically sensitive fiber Bragg grating.

Non-limiting examples of various aspects and variations of the invention are described herein and illustrated in the accompanying drawings. The following detailed description is merely illustrative in nature and is not intended to limit the invention or the application and uses of the invention. Although the description of the invention is in the context of optical sensor systems, methods, and devices for ultrasound imaging, the disclosure should not be considered so limiting. For example, although methods may be discussed herein with respect to medical ultrasound, embodiments hereof may be suitable for other medical procedures as well as other procedures or methods in other industries that may benefit from the sensing and imaging technologies described herein. Further, various systems and devices that incorporate optical sensors are described. It should be understood that optical sensors, as described herein, may be integrated into and/or used with a variety of systems and devices not described herein. Modifications may be made to the embodiments described herein without departing from the spirit and scope of the present invention. Therefore, the following detailed description is not meant to be limiting. Furthermore, there is no intention to be bound by any expressed or implied theory presented in the preceding technical field, background, summary, or the following detailed description.

Various structures are described herein according to their geometric properties. As discussed herein, all structures so described may vary from the described shape according to the tolerances of known manufacturing techniques. Unless otherwise specified, features described with the term "substantially" are understood to be within 5% of exactness. For example, features described as "substantially parallel" may deviate from true parallel by 5%.

Some existing ultrasound technologies use acoustic energy generating (AEG) materials for transducers to generate and receive acoustic signals. Commonly used AEG transducers include piezoelectric materials such as lead-zirconate-titanate (PZT), ceramic, piezoelectric single crystal (e.g., PIN-PT, PIN-PMN-PT), polymer thick film (PTF), polyvinylidene fluoride (PVDF), capacitive micromachined ultrasonic transducers (CMUT), photoacoustic transducers, piezoelectric micromachined ultrasound transducers (PMUT), among many other materials known to those of skill in the art. However, some of the challenges associated with use of these materials aside from the trade-offs between resolution and penetration depth, include high operation voltage requirements, a high electric field requirement (which may cause breakdown and failure), a non-linear response with high hysteresis, and limited angle of detection. Furthermore, the detection sensitivity of AEG transducers is a function of size, thereby limiting the suitability of size-constrained applications such as intravascular ultrasound (IVUS) devices.

Another challenge is the narrow bandwidth of an AEG transducer. For example, for ultrasound transducers made of piezoelectric material, such as lead zirconate titanate (PZT), the 6 dB bandwidth of PZT is generally limited to only about 70%. Certain composite PZT materials have a slightly increased bandwidth, but still only achieve a bandwidth of up to about 80%. As another example, single crystal materials have increasingly been used in an effort to improve performance of ultrasound probes but have lower Curie temperatures and are brittle. Another type of transducer material is silicon, which can be processed to build Capacitive Micromachined Ultrasound Transducer (CMUT) probes that can have increased bandwidth. However, CMUT probes are not very sensitive or reliable. Moreover, CMUT probes have several operational limitations. For example, CMUT probes are nonlinear transducers and, therefore, are not generally suitable for harmonic imaging. In addition, CMUT probes require an additional bias voltage to operate properly. Thus, there is a need for new and improved devices and methods for ultrasound imaging modes with various frequency harmonics to obtain higher resolution, better penetration, and fewer artifacts than fundamental imaging of conventional ultrasound sensing.

In many applications, it is desirable to detect multiple kinds of physical parameters. For example, in the field of medical technology, it may be advantageous to have medical devices with sensors that can sense multiple different physical parameters (e.g., simultaneously in real-time or near real-time). For example, ablation catheters for cardiovascular procedures may include temperature sensors to measure the temperature of the treated tissues and force sensors to measure the force applied to the arterial wall during heart ablation. It may be possible to incorporate multiple kinds of sensors together in a single device to monitor multiple different kinds of parameters, in addition to, or instead of, imaging. However, the inclusion of more sensors may result in a device that may be more challenging to fit into a desired form factor. Additionally or alternatively, the inclusion of more sensors may pose more difficulties in accommodating additional components (e.g., mechanical and/or electrical) and connections to enable proper functioning of all of the different sensors.

The use of optical sensors as multi-dimensional sensors for sensing physical parameters alleviates many difficulties associated with combining multiple sensors and their various components and connections. To accomplish multi-dimensional sensing, measurement signals are generated from optical sensor responses, where each of these measurement signals may be indicative of a respective physical signal. For example, a signal processor may generate a temperature measurement signal based at least in part on the resonant frequency shift (e.g., mode shift) and an acoustic measurement signal based at least in part on oscillation of optical power. Multi-dimensional sensing can also be achieved by using multiple sensors, each responding differently to different sensing targets. Variations of generating measurement signals from optical sensor responses, may include decoupling individual physical signals and/or collectively analyzing the multiple sensor responses to determine individual physical signals.

Photonic devices and optical pressure detection techniques have shown great promise for ultrasound detection. In photonic devices, refractive index modulation and/or shape deformations due to strain induced by an acoustic wave are translated into changes in the intensity of the detected light or the spectral properties of the device. In some existing devices, optical resonators have been used as highly sensitive ultrasound detectors. In general, the performance of an optical resonator is limited by its quality factor Q (i.e., the higher the Q, the lower the optical loss and the smaller the detectable resonance shift) as well as by the acousto-optical and mechanical properties of the material from which the resonator is made. Optical sensors, such as, for example, whispering galley mode (WGM) optical resonators, may have high sensitivity and broad bandwidth in reception of ultrasound signals compared to other types of ultrasound sensors. Because of the high sensitivity and broad bandwidth of optical sensors, the image produced by the optical sensors may have improved spatial resolution, improved penetration depth, improved signal-to-noise ratio (SNR), improved tissue harmonic imaging, and/or improved Doppler sensitivity.

Acousto-optic systems based on optical sensors may directly measure ultrasonic waves through the photo-elastic effect and/or physical deformation of the resonator(s) in response to the ultrasonic waves (e.g., ultrasonic echoes). For example, in the presence of ultrasonic (or any pressure) waves, the WGMs traveling an optical resonator may undergo a spectral shift caused by changes in the refractive index and shape of the optical resonator. The spectral change can be easily monitored and analyzed in spectral domain and light transmission intensity to and from the optical resonator. Additional spatial and other information can furthermore be derived by monitoring and analyzing shifting WGMs among multiple optical resonators.

Acoustic or ultrasound capabilities can be categorized with respect to sensitivity, resolution, and field of view, among others. Sensitivity is related to the single sensor element design and optimization. Resolution and field of view are limited by sensor array configuration, which includes space between adjacent sensors, total number of sensors in one imaging probe, length and width of sensor arrays covering a sufficient field of view, etc. Thus, challenges exist in designing a robust efficient acoustic-optical sensor with minimal loss in the form factor needed.

Several factors must be considered when designing optical sensors for physical measurements and/or acoustic detection. Optical loss must be minimized, as loss will fundamentally affect the efficiency of the sensor. Careful attention is needed when designing the coupling gap between the resonator and waveguide, along with determining the appropriate waveguide cross section. Noise must be minimized to optimize the SNR, and various parameters must be balanced, such as laser power, the array size required, the space available on a chip or array structure, the power required, the number of channels needed in view of the number of sensors needed, and the effect of all components along the signal path.

The present invention is related to the use of FBGs for acoustic sensing of acoustic transmitted signals or acoustic waves induced by optical signals such as that generated either by conventional PZT arrays or a nanosecond pulsed laser through photoacoustic effects. A fiber Bragg grating (FBG) is a type of distributed Bragg reflector constructed in a short segment of optical fiber that reflects particular wavelengths of light and transmits all others. This is achieved by creating a periodic variation in the refractive index of the fiber core, which generates a wavelength-specific dielectric mirror. As will be discussed in detail below, the optical fibers with acoustically sensitive fiber Bragg gratings, and the optical sensors including the same, increase sensitivity and resolution without considerable increases in size or power requirements.

Figure 2:
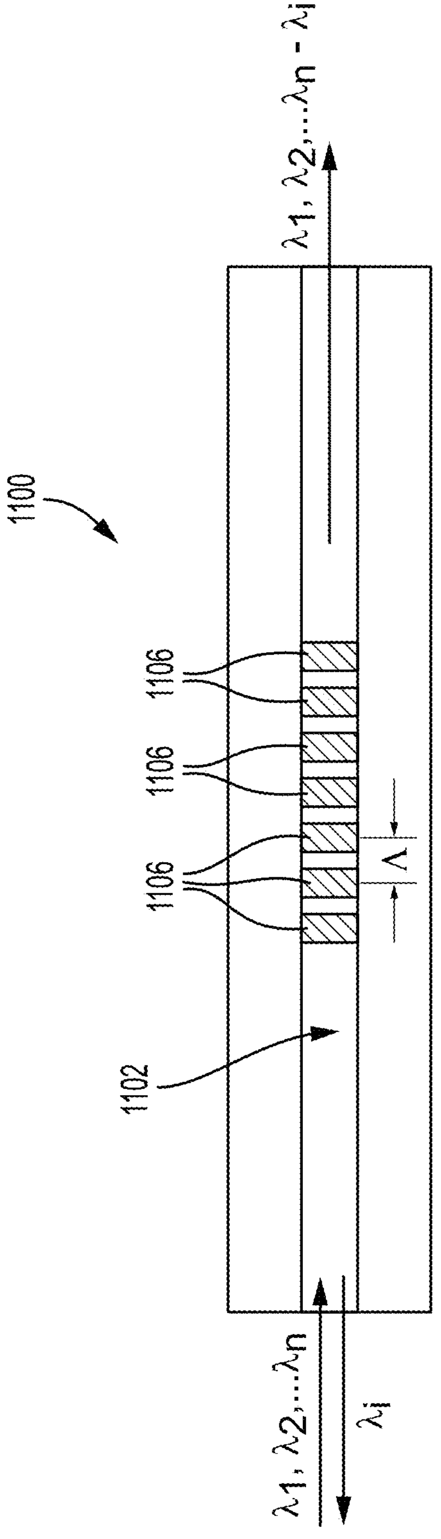
FIG. 2 PRIOR ART
FIG. 2 diagrammatically illustrates a conventional fiber Bragg grating.

As shown in FIG. 2, optical fiber 1100 includes a core 1102 clad in a cladding layer. A fiber Bragg grating is formed in a segment of the core 1102 by a periodic arrangement of regions 1106 which have a different index of refraction from the remainder of the core 1102. The regions 1106 are periodically spaced apart (in the axial direction) by a distance Λ; i.e., the refractive index of the fiber core 1102 is modulated with a period of A. When light with a broad spectrum of wavelengths ($\lambda_1, \lambda_2, \ldots, \lambda_n$) is transmitted through optical fiber 1100, all wavelengths will continue through the fiber Bragg grating except for light at the "Bragg wavelength", which will be reflected back. In FIG. 2, the Bragg wavelength is represented as $\lambda_i$. In general, the Bragg wavelength, $\lambda_B$, is given by $\lambda_B=2n_e\Lambda$, where $n_e$ is the effective refractive index of the grating in the fiber core.

FBGs have found wide use in the field of sensors, since the Bragg wavelength, which is a known constant under stable conditions, can shift due to variations in temperature and strain. Particularly, the shift of Bragg wavelength, $\Delta\lambda_B$, is given by $\Delta\lambda_B=(C_s\epsilon+C_T\Delta T)\lambda_B$, where $C_S$ is the coefficient of strain for the optical fiber, $\epsilon$ is the applied strain, $C_T$ is the coefficient of temperature for the optical fiber, and ΔT is the change in temperature. For constant temperatures, the measurement of $\Delta\lambda_B$ yields a highly accurate measurement of applied strain. Given the accuracy of measurement, the strain can be relatively small, making FBGs highly effective for measuring very small vibrations, including those produced by acoustic waves impinging on the optical fiber.

Figure 3:
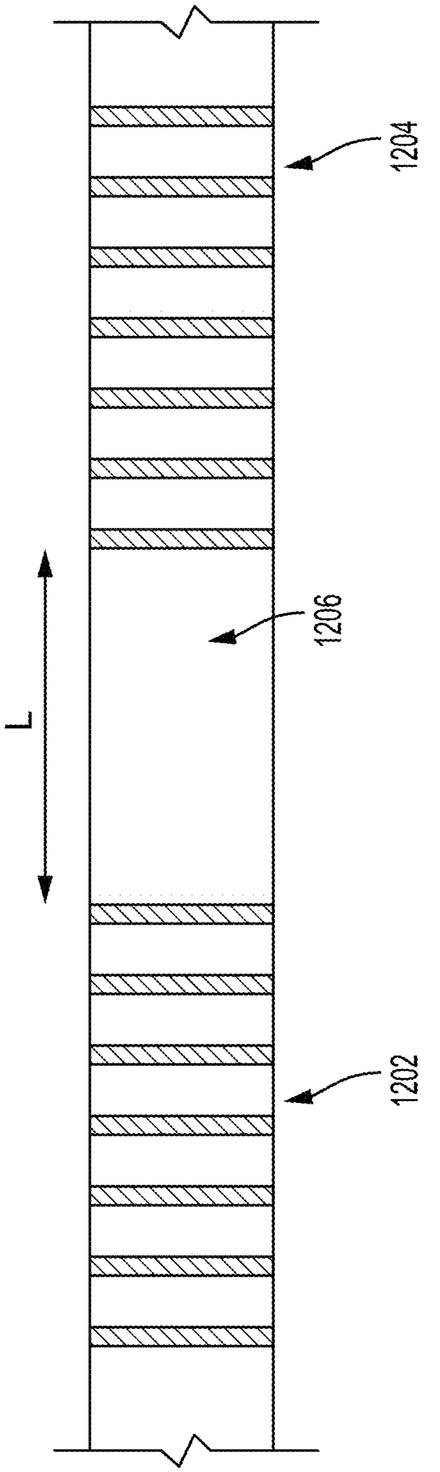
FIG. 3 PRIOR ART
FIG. 3 diagrammatically illustrates a Fabry-Pérot interferometer formed from a fiber Bragg grating.

When, as in FIG. 3, two FBGs are formed within an optical fiber, separated from one another by a distance L, a Fabry-Pérot interferometer (FPI) is created within the region 1206 between the two FBGs 1202 and 1204. If the first FBG 1202 has a reflectance of $R_1$ and the second FBG 1204 has a reflectance of $R_2$, then the Fabry-Pérot reflectance, $R_{FP}$, and the Fabry-Pétransmittance, $T_{FP}$, are given by:

$$R_{FP}=\frac{R_1+R_2+2\sqrt{R_1R_2}\cos\phi}{1+R_1R_2+2\sqrt{R_1R_2}\cos\phi} \tag{1}$$

$$T_{FP}=\frac{T_1T_2}{1+R_1R_2+2\sqrt{R_1R_2}\cos\phi}, \tag{2}$$

where $R_{FP}$ represents the ratio of the power reflected by the FPI, $P_r$, to the incident power on the FPI, $P_i$, $T_{FP}$ is the ratio of the transmitted power $P_t$ to the incident power, $P_i$, and ϕ represents the round-trip propagation phase shift in the interferometer, which is defined by:

$$\phi=\frac{4\pi nL}{\lambda}, \tag{3}$$

where n is the refractive index in region 1206 and λ is the free space optical wavelength.

From equation (2), it is clear that $T_{FP}$ is at a maximum when cos ϕ=−1, or when ϕ=(2m+1)π, where m is an integer. From equation (3), it can be seen that the distance L of region 1206 has a directly proportional effect on ϕ, thus a change in L (due to an external strain, for example) will have a measurable effect on ϕ. In an "intrinsic" Fabry-Pérot interferometer-based sensor, an optical fiber (typically, a single mode fiber) transports light from an emitter to the interferometer, and from the interferometer to a photodetector. In a conventional intrinsic Fabry-Péinterferometer sensor, the two FBGs are separated by a length of the single-mode fiber, and a property being measured (e.g., strain, temperature, etc.) affects the optical pathlength L, thus creating a measurable shift in ϕ. Based on the measured shifts in ϕ, the magnitude of the strain, etc. can be determined with high accuracy.

The amount of damping within the Fabry-Péinterferometer is measured by a quality factor, which is typically referred to as the "Q factor" in optics. The Q factor is a dimensionless parameter that describes how underdamped a resonator is. In optics, the Q factor of a resonant cavity is given by:

$$Q=\frac{2\pi f_0E}{P}, \tag{4}$$

where $f_0$ is the resonant frequency, E is the stored energy in the cavity, and $$P=-\frac{dE}{dt}$$

is the power dissipated. The optical Q factor is equal to the ratio of the resonant frequency to the bandwidth of the cavity resonance. The average lifetime of a resonant photon in the cavity is proportional to the cavity's Q factor. Thus, a high Q factor represents low damping, with a high lifetime for a photon within the cavity. Returning to equations (1) and (2) above, the cavity damping is determined by the reflectance $R_1$ and $R_2$, and the optical Q factor could be observed from the transmittance or reflection spectrum. High reflectance leads to high Q factors and narrow spectral patterns ϕ=(2m+1)π, which is known as the resonance condition (m is an integer).

The above, however, is based on a Fabry-Péinterferometer such as that shown in FIG. 3, where region 1206 is made from the same material as the non-FBG portions of the core of the fiber. Thus, the Q factor, as well as any other determinations of sensitivity and responsiveness, are ultimately limited by the choice of material used for the optical fiber core. Although silica, for example, has excellent optical transmission capabilities, it does not have equally exceptional acoustic sensitivity. Although numerous materials with superior acoustic sensitivity are known, such materials, on their own, typically would not make suitable replacements for silica and the like for optical fiber cores. There is a need to adapt Fabry-Péinterferometers based on conventional optical fiber cores to take advantage of the acoustic sensitivity found in other materials.

The above limitations are caused by the grating structures and the short length of fiber between the structures in conventional Fabry-Péinterferometers being made from the same material. Due to conventional manufacturing, which forms Fabry-Péinterferometers from a singular material, there is large constraint in optimizing the design for the grating structures and the material between them for specific applications, such as ultrasound sensing. For example, some polymers are very responsive to ultrasound induced pressure or strain, but the design of, and manufacturing techniques for, conventional Fabry-Perot interferometers prevent the creating of gratings in such polymeric materials. Thus, an optical fiber with an acoustically sensitive fiber Bragg grating and an ultrasound sensor including the same solving the aforementioned problems are desired.

In addition to the use of acoustically sensitive material, the grating structure may also be modified to increase acoustic sensitivity through: (1) shape change of the glass spacer from a cylinder to a tapered cylinder; (2) material changes from a glass spacer to a polymer spacer; (3) reflection surface changes from a flat surface to a curved surface; and (4) coating or packaging the outer surface by using a polymer layer. In addition, the cross-section of the fiber used for creating the fiber Bragg gratings can be round or square in shape, which will have different impacts on the sensor performance. The FBG elements can also be fabricated on a silicon chip.

As shown in FIG. 1A, in one embodiment, the optical fiber with an acoustically sensitive fiber Bragg grating 10 includes an optical fiber core 12 with a pair of fiber Bragg gratings 16, 18 formed therein, such that each of the fiber Bragg gratings 16, 18 is spaced apart from the other. Although fiber Bragg gratings 16, 18 are shown as being identical in the non-limiting example of FIG. 1A, it should be understood that the grating parameters associated with gratings 16, 18 may also be non-identical. A cladding material 20 is disposed on and surrounds at least a portion of the optical fiber core 12. As shown, the cladding material 20 may at least partially cover the fiber Bragg gratings 16, 18 and the region therebetween. The cladding material 20 has at least one material property associated therewith, where the at least one material property may be a smaller Young's modulus than a Young's modulus of the optical fiber core 12, a larger photo-elastic coefficient than a photo-elastic coefficient of the optical fiber core 12, a lower refractive index (RI) than a refractive index of the optical fiber core 12, or combinations thereof. It should be understood that the optical fiber core 12 may be any suitable type of optical fiber core, such as those made from silica, silicon, optically transparent polymers, or the like. As a non-limiting example, if the optical fiber core 12 is made from silica ($SiO_2$), the cladding material 20 may be MY-133, a low refractive index optical coating manufactured by MY Polymers Ltd. of Israel, or BIO-133, also a low refractive index optical coating manufactured by MY Polymers Ltd. of Israel. As a further non-limiting example, if the core is silicon, which has a higher RI than silica, the cladding material 20 may be polyvinylidene fluoride (PVDF), polystyrene (PS), parylene, benzocyclobutene (BCB), MY-133, or BIO-133. It should be further understood that, as an alternative, one of the fiber Bragg gratings 16, 18 may be replaced by any other suitable type of reflector, such as, for example, a metal coating mirror, a dielectric coating mirror, a total internal reflection mirror, or the like.

It should be understood that the acoustically sensitive fiber Bragg grating 10 of FIG. 1A may have any desired relative dimensions and may be manufactured using any suitable method. As a non-limiting example, the acoustically sensitive fiber Bragg grating 10 of FIG. 1A may be sized for use with chip-scale sensors. As a further non-limiting example, the acoustically sensitive fiber Bragg grating 10 of FIG. 1A could be manufactured by first creating the overall waveguide structure followed by the incorporation of the grating elements 16, 18. As a non-limiting example, the grating elements 16, 18 could be created using deep ultraviolet (DUV) writing, in which a focused ultraviolet (UV) laser beam is used to locally modify the refractive index of the photosensitive silica layer. By scanning the laser beam across the waveguide, periodic refractive index variations are created, forming the grating structure. Precise control over the scanning speed and intensity allows for the desired grating period and depth. To complete the fabrication process, the cladding layer 20 is applied to the waveguide structure. The thickness of the cladding material 20 may, as a non-limiting example, range from tens of nanometers to tens of micrometers.

Figure 1B:
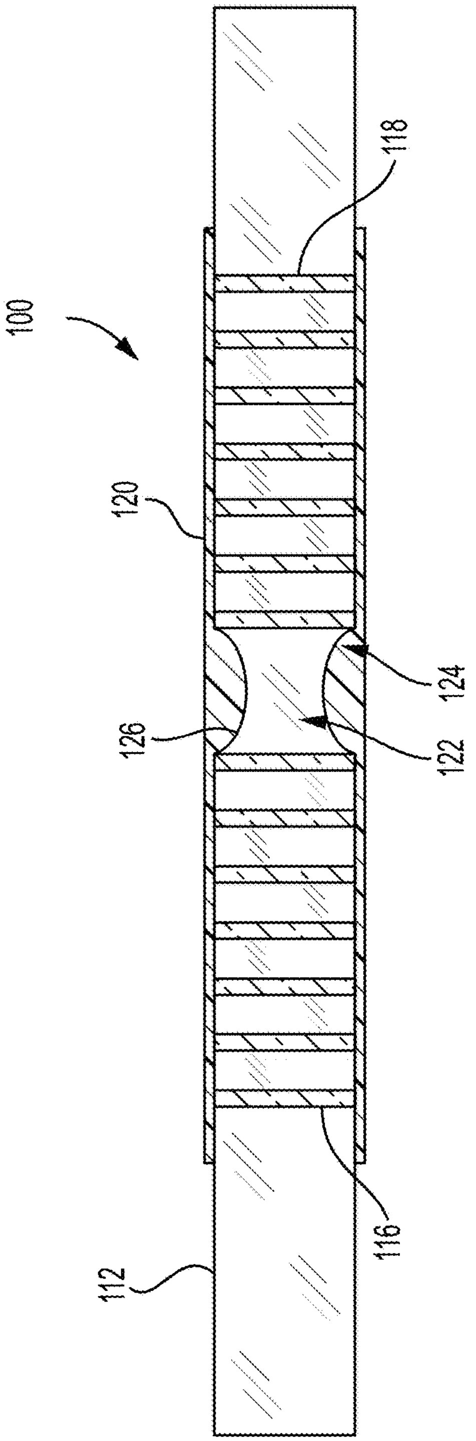
FIG. 1B shows a side view in section of an alternative embodiment of the acoustically sensitive fiber Bragg grating.

As shown in the alternative embodiment of FIG. 1B, the optical fiber with an acoustically sensitive fiber Bragg grating 100 may include an optical fiber core 112 which is tapered, such that the region 122 of the optical fiber core 112 which is between the pair of fiber Bragg gratings 116, 118 has a diameter which is less than a diameter of the remainder of the optical fiber core 112. The tapering may be defined by a recess 124 formed in an outer surface 126 of the optical fiber core 112, where the recess 124 is aligned with the region 122, and with the cladding material 120 filling the recess.

Figure 4A:
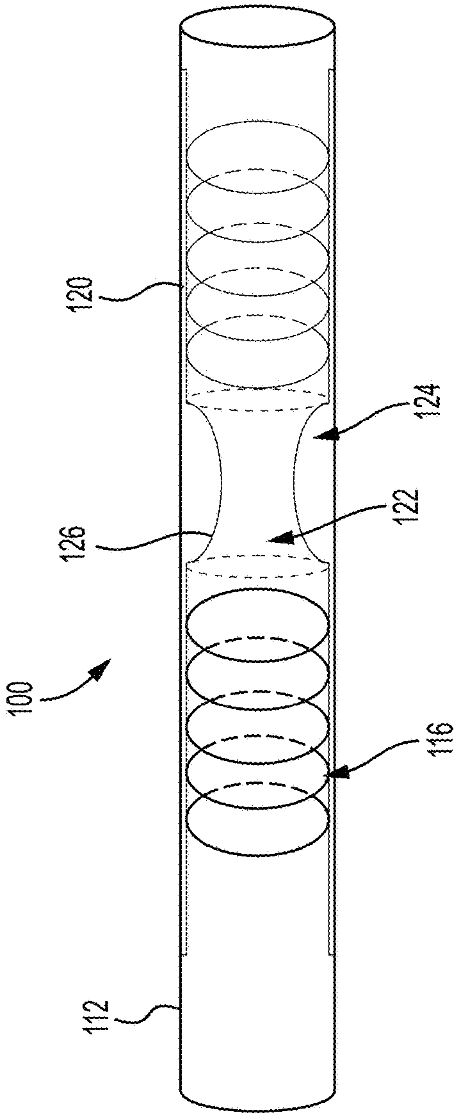
FIG. 4A diagrammatically illustrates the acoustically sensitive fiber Bragg grating of FIG. 1B.
Figure 4B:
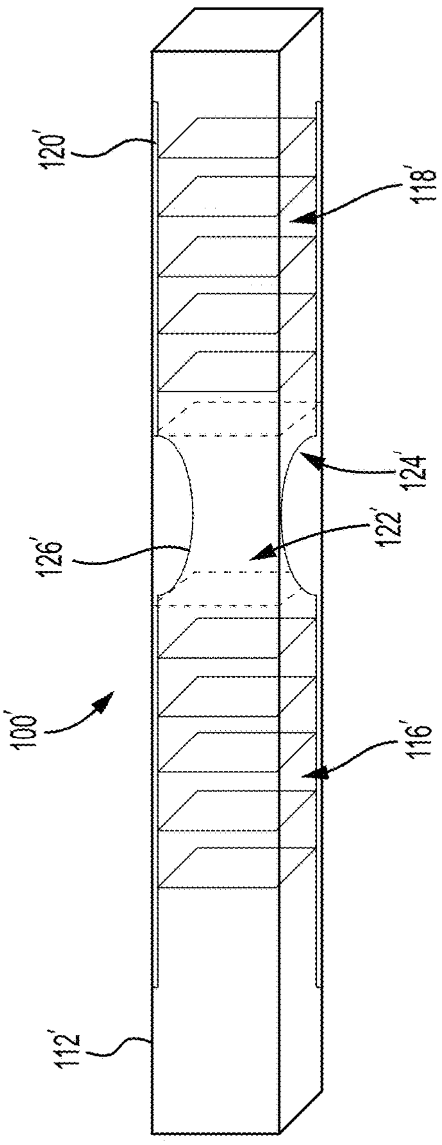
FIG. 4B diagrammatically illustrates an alternative embodiment of the acoustically sensitive fiber Bragg grating of FIG. 4A.

As a non-limiting example, where the optical fiber core 112 is cylindrical, as shown in FIG. 4A, the recess 124 may be an annular recess. However, it should be understood that the relative dimensions, shape and location of recess 124 shown in FIGS. 1B and 4A are shown for exemplary purposes only and may be varied. It should be further understood that the optical fiber core 112 (and thus the overall optical fiber) is not required to be cylindrical. In the non-limiting example of FIG. 4B, optical fiber 100' has an optical fiber core 112' with a substantially square cross-sectional contour. Optical fiber 100' of FIG. 4B is similar to optical fiber 100 of FIG. 4A, including a recess 124' formed in central tapered region 122' and defined by outer surface 126', as well as a pair of fiber Bragg gratings 116', 118' formed in the optical fiber core 112'. It should be understood that for purposes of illustration and clarity, cladding layers 120 and 120' in FIGS. 4A and 4B, respectively, are shown as clear and colorless, however, as in the previous embodiment, cladding layers 120 and 120' at least partially surround their respective optical cores 112, 112'.

It should be understood that the acoustically sensitive fiber Bragg grating 100 of FIG. 1B may have any desired relative dimensions and may be manufactured using any suitable method. As a non-limiting example, the acoustically sensitive fiber Bragg grating 100 of FIG. 1B may be manufactured in a similar manner to that described above for the acoustically sensitive fiber Bragg grating 10 of FIG. 1A, but with the tapered waveguide structure created using, as non-limiting examples, selective chemical etching, micro-polishing, or high-power femtosecond laser machining. These exemplary methods enable the precise shaping of the waveguide profile to achieve the desired taper. The waist diameter of the tapered waveguide (i.e., the smallest diameter along the waveguide) can be decreased to a few hundred nanometers, as a non-limiting example, in order to ensure a large portion of the light field in the polymer coating to increase the ultrasound sensitivity. The length of the tapered area could range, as a non-limiting example, from a few hundred micrometers to a few hundred millimeters.

Figure 4C:
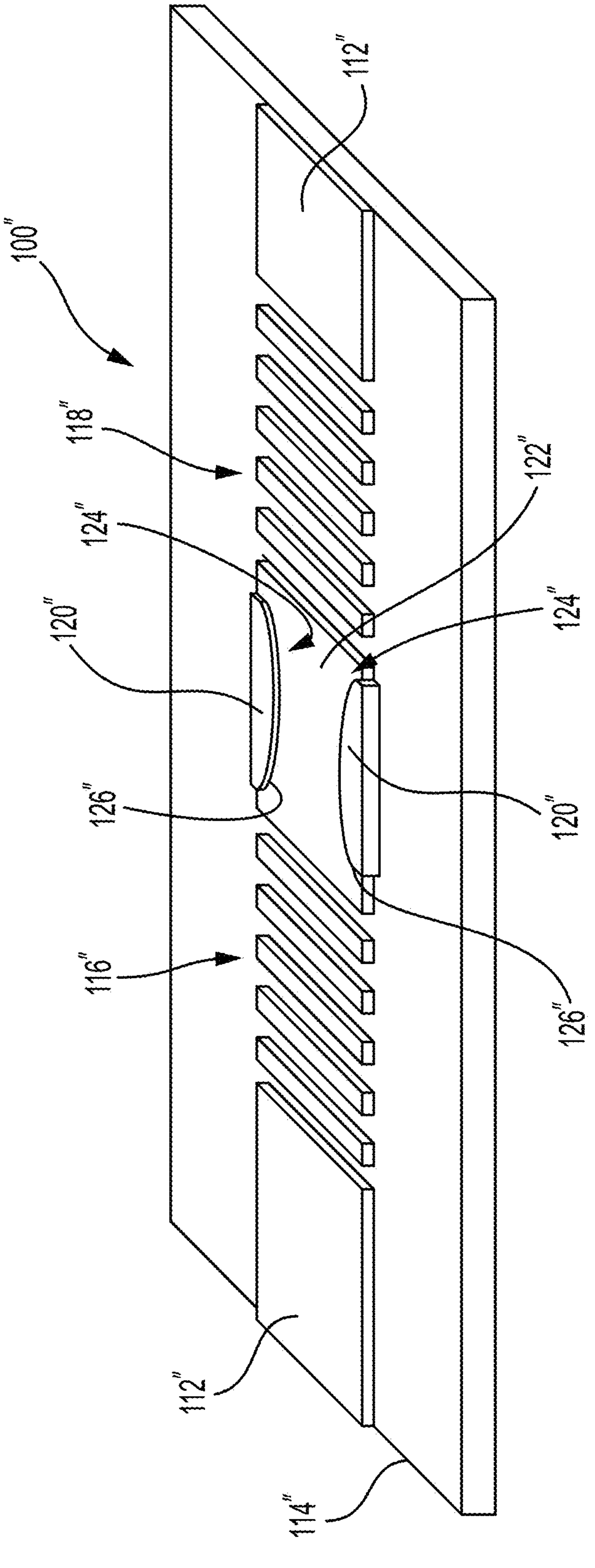
FIG. 4C is a perspective view of another alternative embodiment of the acoustically sensitive fiber Bragg grating of FIG. 4A.

As a further alternative, as shown in FIG. 4C, the optical fiber with an acoustically sensitive fiber Bragg grating 100" may also be formed as an "on chip" fiber Bragg grating, with a layer 112" coated or otherwise deposited on a substrate 114", where layer 112" corresponds to an optical fiber core that may be made of silica, silicon or any other suitable material. A similar central layer 122" corresponds to central region 122 of the embodiment of FIG. 1B. The pair of fiber Bragg gratings 116", 118" are similarly coated or otherwise deposited on substrate 114' and spaced apart from one another in a manner similar to a conventional fiber Bragg grating arrangement. Similar to the embodiment of FIG. 1B, central region 122" has a tapered profile with recesses 124" defined by outer edges 126". Layers of material 120" file recesses 124", where material 120" corresponds to cladding material 120 in the embodiment of FIG. 1B.

In each of the embodiments discussed above, the cladding material is selected to be responsive to, for example, changes in ultrasound-induced pressure or strain. With regard to the tapered contour of the embodiment of FIG. 1B, for example, the amount of optical field leaking into the cladding material 120 is an important consideration. The evanescent field is the portion of the optical field that leaks into the cladding material 120 and decays exponentially from the optical fiber core 112. When a material sensitive to ultrasound, and also with at least one material property including a smaller Young's modulus than a Young's modulus of the optical fiber core 112, a larger photo-elastic coefficient than a photo-elastic coefficient of the optical fiber core 112, a lower refractive index than a refractive index of the optical fiber core 112, or combinations thereof, is used as the cladding material 120, the pressure or strain induced by ultrasound will introduce a deformation or refractive index changes, leading to variations in optical signals passing through the optical fiber 100. When used as an ultrasound sensor, for example, the larger the variation, the higher the sensitivity and the better the detection limit.

For tapered cores, such as in the embodiment of FIG. 1B, for example, the amount of evanescent field leaking outside the optical fiber core 112 depends on the particular shape of the taper, which may be defined geometrically by the "waist" and length of the tapered region, for example. Thus, it is noted that the particular shape and relative dimensions of recess 124 should be carefully selected in view of how the evanescent field interacts with the cladding material 120 on the outer surface of the core.

In addition to the geometry of recess 124, it is noted that the cladding material 120 should be applied uniformly and be of high quality (i.e., as pure as possible). With regard to uniformity, during manufacture, it is important that the thickness of the cladding layer be carefully controlled to optimize sensitivity. There is typically a power drop due to material absorption and scattering of the light field in cladding and coating materials, which ultimately affects the signal-to-noise ratio of the sensor, thus controlling the thickness in order to minimize this effect is a significant consideration. Specifically, during manufacture, it is preferable that the enhanced sensitivity and responsiveness of the cladding material 120 is greater in effect than the loss introduced by the extra material absorption.

Figure 1C:
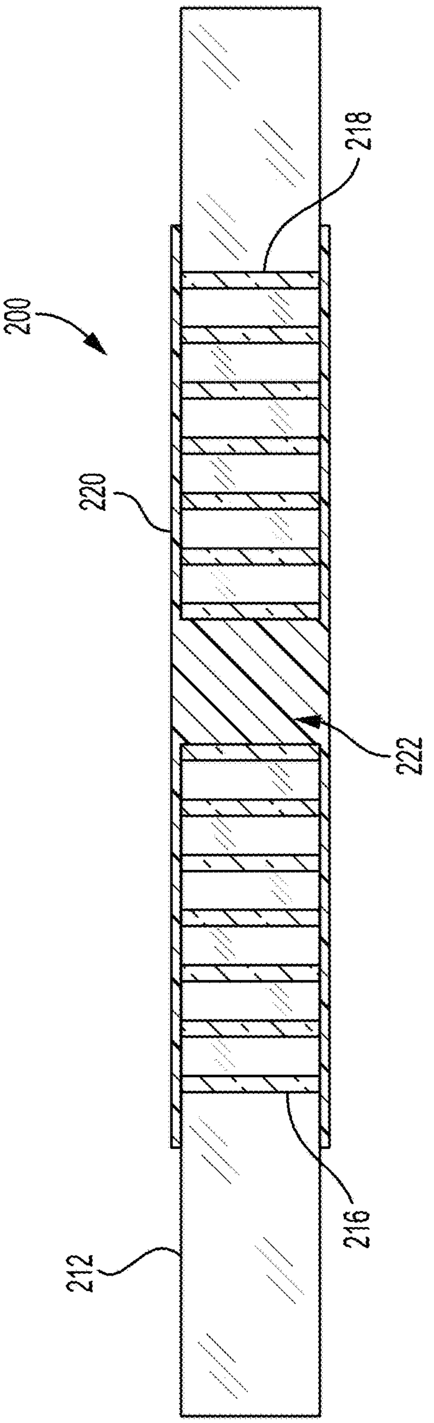
FIG. 1C shows a side view in section of another alternative embodiment of the acoustically sensitive fiber Bragg grating.

The alternative embodiment shown in FIG. 1C is similar to the previous embodiments, with the optical fiber with an acoustically sensitive fiber Bragg grating 200 including an optical fiber core 212, a pair of fiber Bragg gratings 216, 218 formed therein and spaced apart by a region 222, and with a cladding material 220 at least partially covering and surrounding the optical fiber core 212. However, as shown in FIG. 1C, the region 222 of optical fiber core 212 between the pair of fiber Bragg gratings 216, 218 may be at least partially filled with the cladding material 220.

It should be understood that the acoustically sensitive fiber Bragg grating 200 of FIG. 1C may be manufactured using any suitable method. As a non-limiting example, the acoustically sensitive fiber Bragg grating 200 may be manufactured in a similar manner to that discussed above with regard to the acoustically sensitive fiber Bragg grating 10 of FIG. 1A. However, prior to the creation of the gratings, a gap may be created within the waveguide using, as non-limiting examples, selective chemical etching, micro-polishing, or high-power femtosecond laser machining techniques. This gap serves as a spacer between the two grating patterns 216, 218. The Bragg grating pattern is then formed within the waveguide via the DUV writing process, as a non-limiting example, which introduces refractive index variations.

The cladding material 220 is then applied to fill the gap in the planar waveguide. The additional cladding material filling region 222 serves as a spacer with strongly enhanced responsivity to ultrasound waves between the grating patterns 216, 218, enabling efficient interaction with the propagating light and significantly improved ultrasound sensing. As a non-limiting example, the length of the polymer spacer in region 222 can range between a few hundred nanometers to millimeters. The remaining cladding material 222 is then applied to surround the waveguide structure, assisting in confining the guided light within the waveguide and providing optical isolation, protection, and enhanced sensing performance to ultrasound.

Figure 1D:
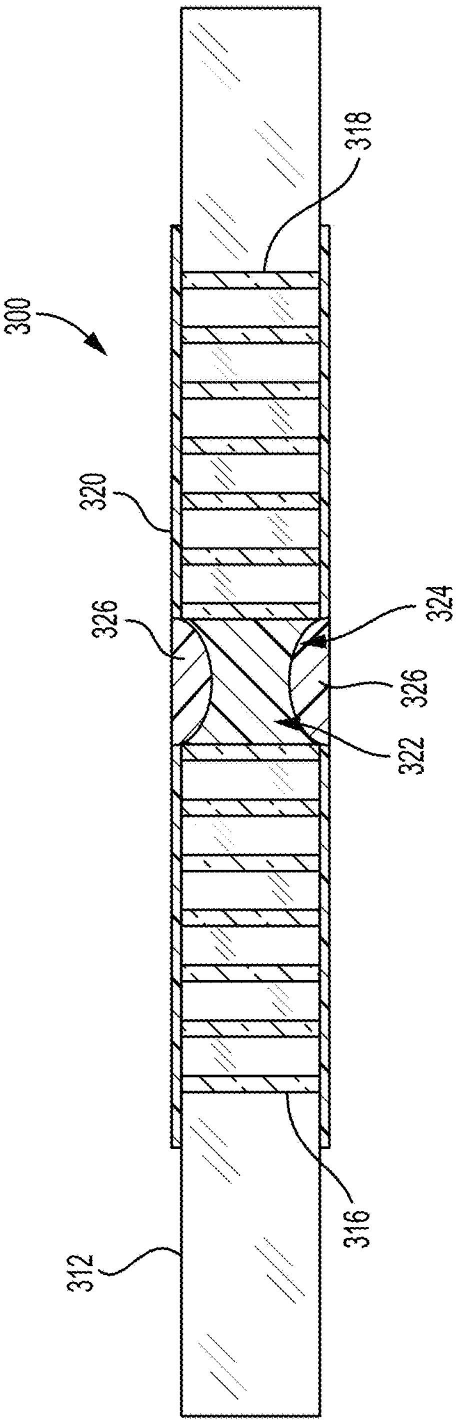
FIG. 1D shows a side view in section of another alternative embodiment of the acoustically sensitive fiber Bragg grating.

The further alternative embodiment shown in FIG. 1D is similar to the previous embodiments, with the optical fiber with an acoustically sensitive fiber Bragg grating 300 including an optical fiber core 312, a pair of fiber Bragg gratings 316, 318 formed therein and spaced apart by a region 322, and with a cladding material 320 at least partially covering and surrounding the optical fiber core 312. Similar to the embodiment of FIG. 1B, the region 322 between the pair of fiber Bragg gratings 316, 318 may be tapered, however, similar to the embodiment of FIG. 1C, region 322 is formed from the cladding material 320 rather than the material of the optical fiber core 312 (e.g., silica or the like). As in the embodiment of FIG. 1B, region 322, which is formed from the cladding material 320, has a diameter which is less than a diameter of the optical fiber core 312. The tapering of region 322 may be defined by a recess 324 formed in the outer surface of region 322. Additionally, as shown, recess 324 may be filled with a secondary cladding material 326. The secondary cladding material 326 may have a smaller refractive index than the refractive index of the cladding material 320.

The embodiment of FIG. 1D uses a tapered core similar to that of the embodiment of FIG. 1B. As discussed above with regard to the embodiment of FIG. 1B, it is preferred that the geometry of the tapered region be optimized to minimize the amount of evanescent field leaking outside of the core while also minimizing the loss of light due to scattering and absorption. Preferably, the contour of the taper has a smooth transition from the cylindrical portion of the core to the waist of the taper. The cladding and/or additional coating materials are then applied to the surface of the tapered region to create a uniform layer that is optimized for the desired sensing application.

It should be understood that the acoustically sensitive fiber Bragg grating 300 of FIG. 1D may be manufactured using any suitable method. As a non-limiting example, an optical fiber core already clad with the cladding material may be provided. The cladding layer may then be selectively etched away, followed by cleaving of the optical fiber core. The Bragg grating pattern may then be created on the optical fiber core using DUV writing, as a non-limiting example. A small amount of the first cladding material 320 may then be applied and the gap between the two facets of the optical fiber core may be adjusted to create the tapered shape. The second cladding material 326 can then be applied to create the hybrid structure.

Figure 1E:
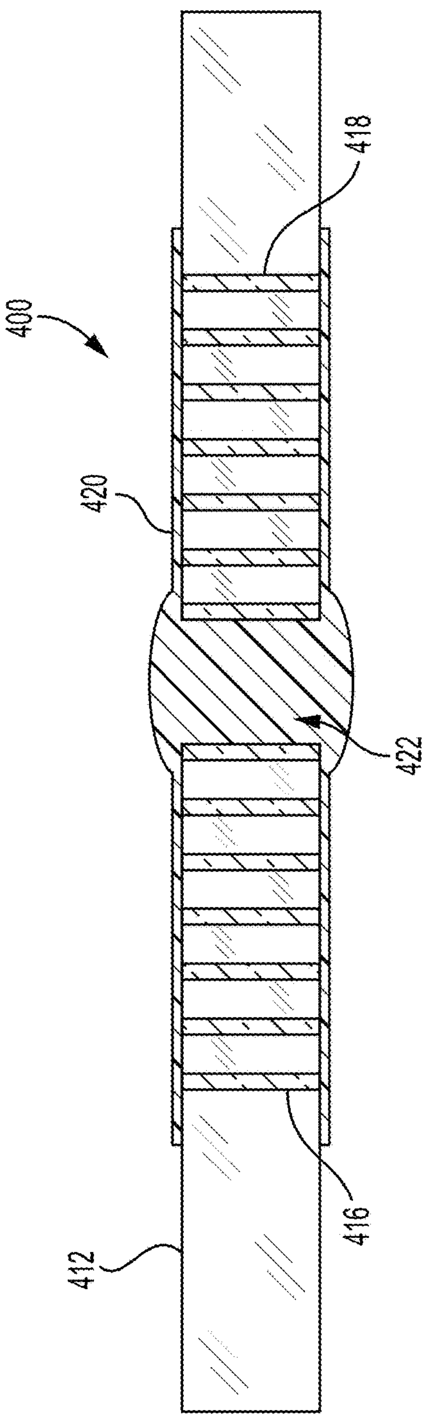
FIG. 1E shows a side view in section of another alternative embodiment of the acoustically sensitive fiber Bragg grating.

The embodiment shown in FIG. 1E is similar to the previous embodiments, with the optical fiber with an acoustically sensitive fiber Bragg grating 400 including an optical fiber core 412, a pair of fiber Bragg gratings 416, 418 formed therein and spaced apart by a region 422, and with a cladding material 420 at least partially covering and surrounding the optical fiber core 412. However, as shown, the region 422 between the pair of fiber Bragg gratings 416, 418 is at least partially filled with the cladding material 420 and may have a diameter which is greater than a diameter of the optical fiber core 412.

Figure 1F:
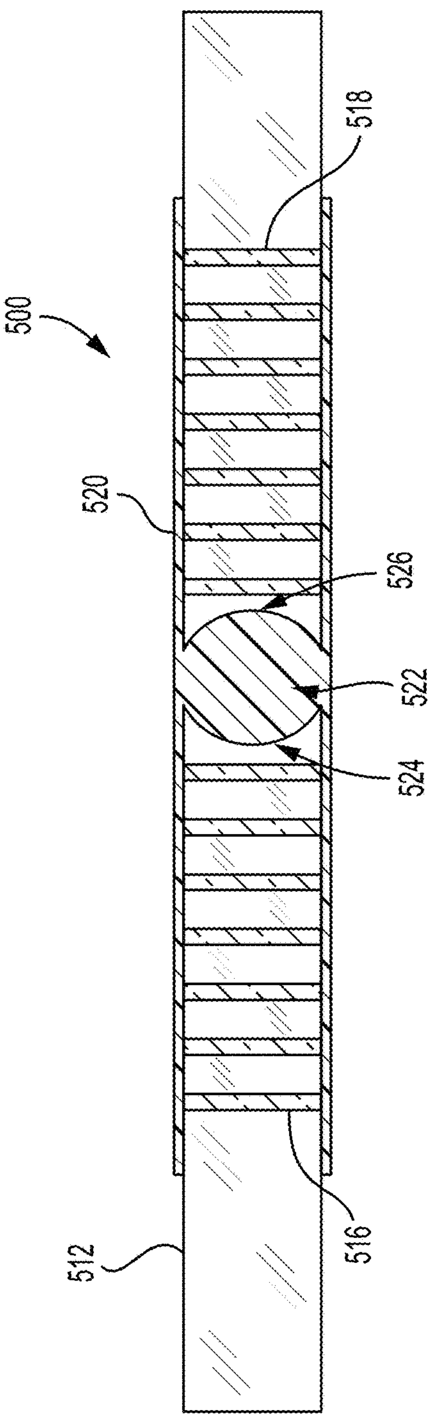
FIG. 1F shows a side view in section of another alternative embodiment of the acoustically sensitive fiber Bragg grating.

The alternative embodiment shown in FIG. 1F is also similar to the previous embodiments, with the optical fiber with an acoustically sensitive fiber Bragg grating 500 including an optical fiber core 512, a pair of fiber Bragg gratings 516, 518 formed therein and spaced apart by a region 522, and with a cladding material 520 at least partially covering and surrounding the optical fiber core 512. In the embodiment of FIG. 1F, the region 522 between the pair of fiber Bragg gratings 516, 518 is at least partially filled with the cladding material 520 and is defined by a pair of convex surfaces 524, 526 respectively facing the pair of fiber Bragg gratings 516, 518.

Figure 1G:
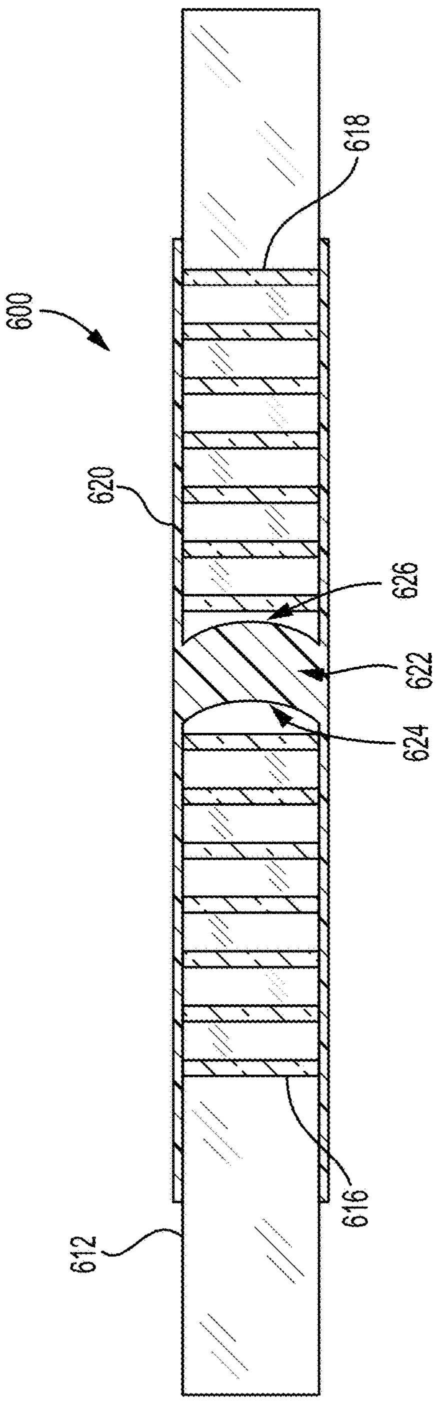
FIG. 1G shows a side view in section of another alternative embodiment of the acoustically sensitive fiber Bragg grating.

The embodiment shown in FIG. 1G is also similar to the embodiment of FIG. 1F, with the optical fiber with an acoustically sensitive fiber Bragg grating 600 including an optical fiber core 612, a pair of fiber Bragg gratings 616, 618 formed therein and spaced apart by a region 622, and with a cladding material 620 at least partially covering and surrounding the optical fiber core 612. However, in the embodiment of FIG. 1G, the region 622 between the pair of fiber Bragg gratings 616, 618 is at least partially filled with the cladding material 620 and may be defined by a concave surface 624 facing one of the fiber Bragg gratings 616 and a convex surface 626 facing the other one of the fiber Bragg gratings 618.

Figure 1H:
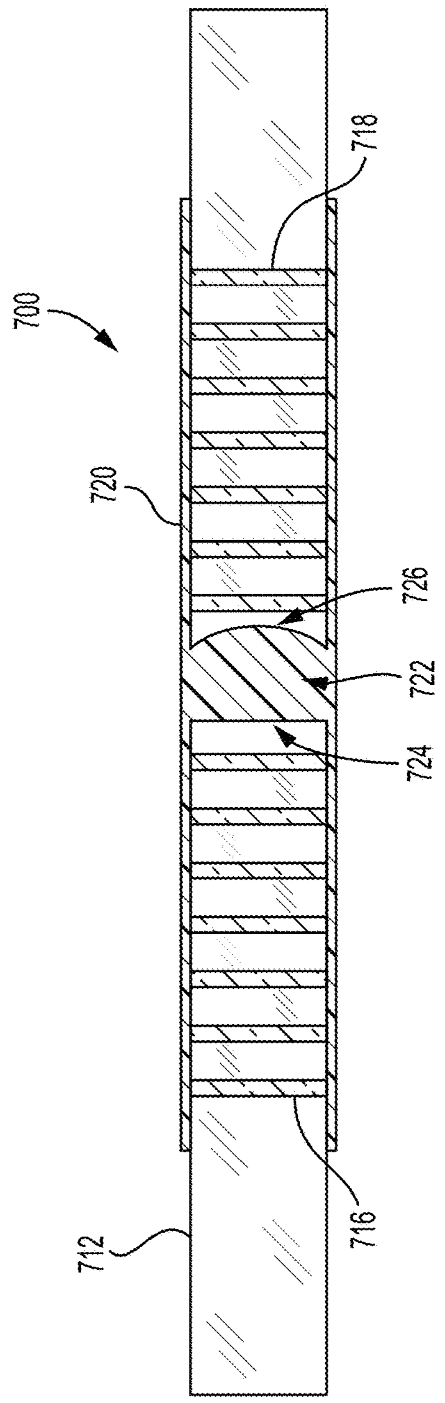
FIG. 1H shows a side view in section of another alternative embodiment of the acoustically sensitive fiber Bragg grating.

The alternative embodiment shown in FIG. 1H is similar to the embodiments of FIGS. 1F and 1G, with the optical fiber with an acoustically sensitive fiber Bragg grating 700 including an optical fiber core 712, a pair of fiber Bragg gratings 716, 718 formed therein and spaced apart by a region 722, and with a cladding material 720 at least partially covering and surrounding the optical fiber core 712. However, in the embodiment of FIG. 1H, the region 722 between the pair of fiber Bragg gratings 716, 718 is at least partially filled with the cladding material 720 and may be defined by a planar surface 724 facing one of the fiber Bragg gratings 716 and a convex surface 726 facing the other one of the fiber Bragg gratings 718. In each of the embodiments of FIGS. 1E-1H, the material between the gratings is replaced by material which is responsive to, for example, ultrasound induced pressure or strain. This is in contrast to a conventional Fabry-Péinterferometer, which is formed uniformly from a single material, such as silica, throughout the entire structure.

The acoustically sensitive fiber Bragg gratings of FIGS. 1E-1H may be manufactured by any suitable method. As a non-limiting example, each may be manufactured in a manner similar to that described above with regard to the embodiment of FIG. 1C, with the difference being in the engineering of the cleaved facets to have concave, convex or planar surfaces. As non-limiting examples, precise control over these facet shapes may be implemented using selective chemical etching, micro-polishing, or high-power femtosecond laser machining. As in the previous embodiments, the cavity between the two Bragg grating structures is filled with a polymer material that exhibits strong responsivity to ultrasound waves, thus leading to significantly enhanced ultrasound sensing, which results in a drastic improvement in sensitivity.

Figure 1I:
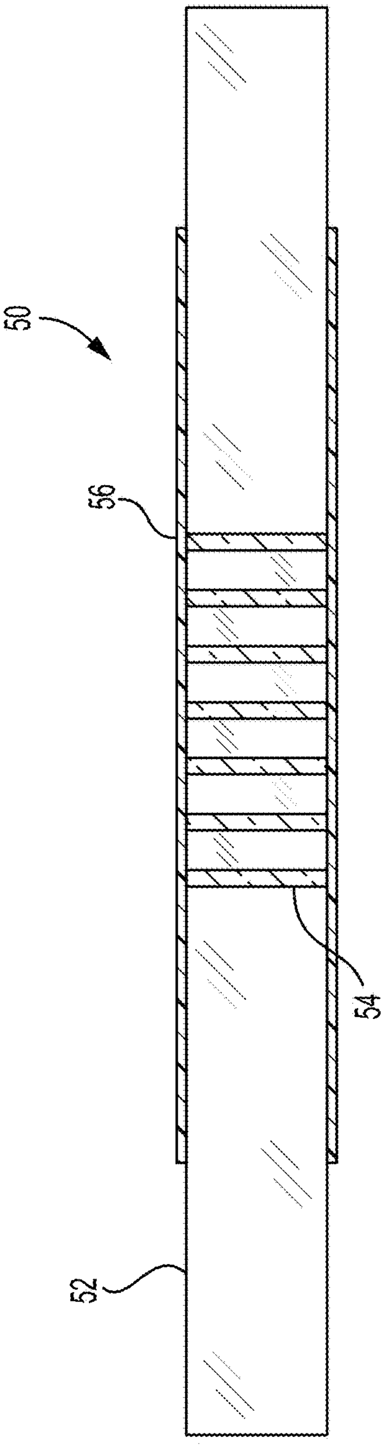
FIG. 1I shows a side view in section of another alternative embodiment of the acoustically sensitive fiber Bragg grating.

As noted above, it should be further understood that, as a further alternative, one of the fiber Bragg gratings in any of the above-described embodiments may be replaced by any other suitable type of reflector, such as, for example, a metal coating mirror, a dielectric coating mirror, a total internal reflection mirror, or the like. Still further, as illustrated in FIG. 1I, it should be understood that the features of the embodiments of FIGS. 1A-1H may be implemented in an optical fiber having only a single fiber Bragg grating. In the non-limiting example of FIG. 1I, the optical fiber with an acoustically sensitive fiber Bragg grating 50 includes an optical fiber core 52 with only a single fiber Bragg grating 54 formed therein. Similar to the previous embodiments, a cladding material 56 at least partially covers and surrounds the optical fiber core 52. Although the non-limiting example of FIG. 1I shows the cladding material 56 symmetrically arranged about the center of the single fiber Bragg grating 54, it should be understood that the relative locations of cladding material 56 and grating 54 may be varied.

Figure 1J:
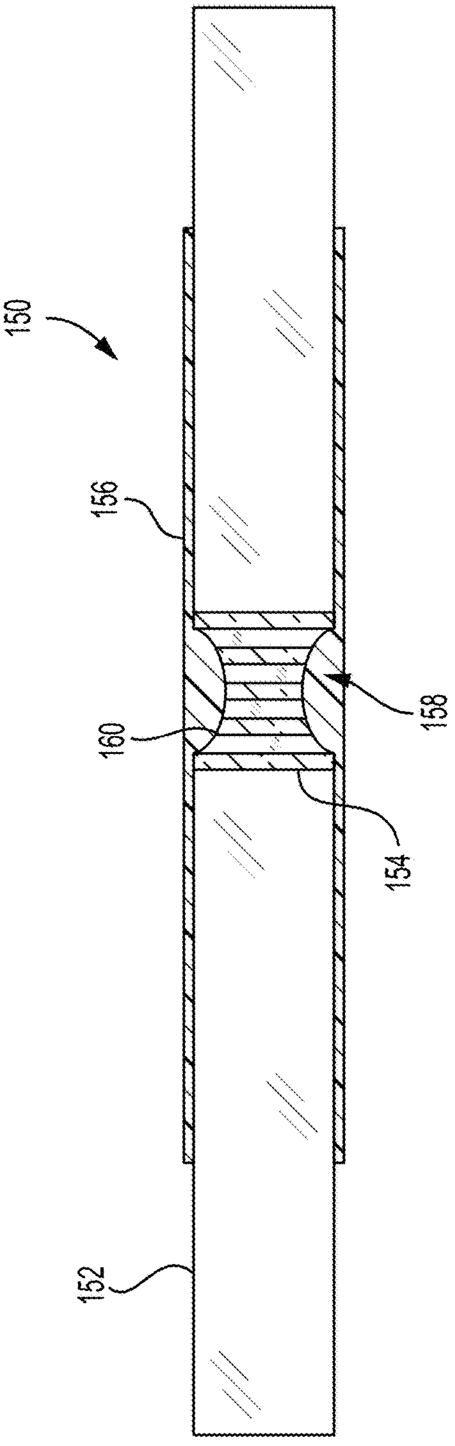
FIG. 1J shows a side view in section of still another alternative embodiment of the acoustically sensitive fiber Bragg grating.

Similarly, the optical fiber with an acoustically sensitive fiber Bragg grating 150 of the alternative embodiment of FIG. 1J is similar to the embodiment of FIG. 1B, but with only a single fiber Bragg grating 154 formed in optical fiber core 152. Similar to the embodiment of FIG. 1B, a recess 158 is formed in an outer surface 160 of the optical fiber core 152. The cladding material 156 at least partially covers and surrounds the optical fiber core 152 and also fills the recess 158. Although the non-limiting example of FIG. 1J shows the cladding material 156 symmetrically arranged about the center of the single fiber Bragg grating 154, and also shows the single fiber Bragg grating 154 symmetrically arranged about the center of the tapered region defined by the recess 158, it should be understood that the relative locations of cladding material 156 and grating 154 may be varied, and that the location, shape and relative dimensions of recess 158 are shown for exemplary purposes only.

Figure 1K:
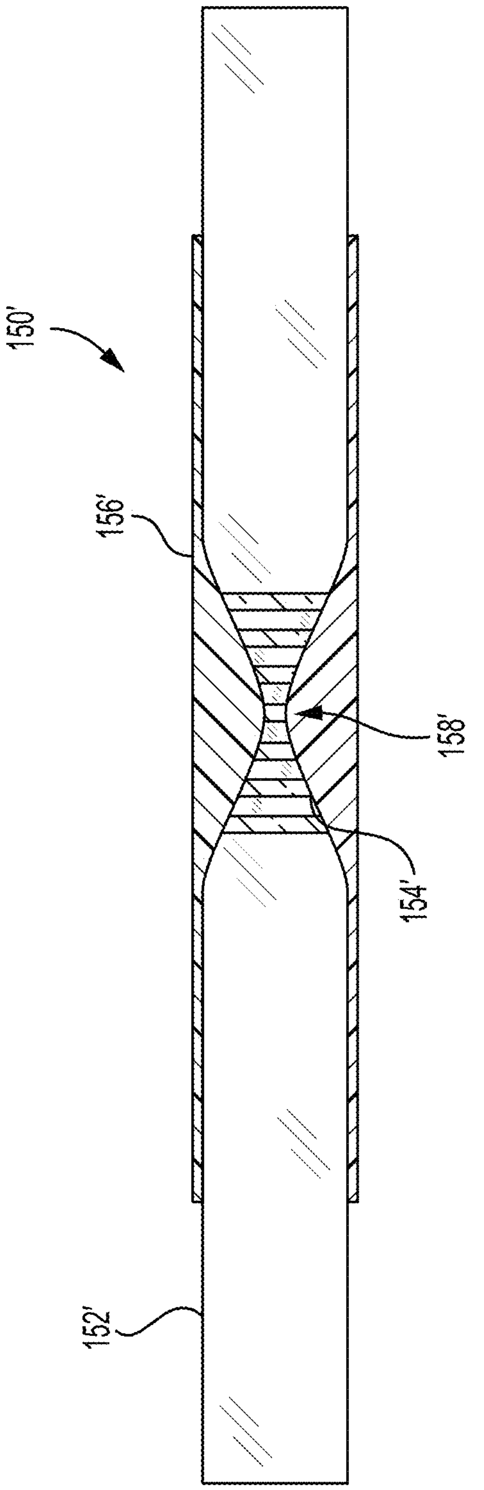
FIG. 1K shows a side view in section of still another alternative embodiment of the acoustically sensitive fiber Bragg grating.

As a further example of variations in the shape of the recess, the acoustically sensitive fiber Bragg grating 150' of the alternative embodiment of FIG. 1K is similar to that of FIG. 1J, but with a recess 158' formed with such depth that the very center of recess 158' is almost completely formed of cladding material 156'. Although the non-limiting example of FIG. 1K shows the cladding material 156' symmetrically arranged about the center of the single fiber Bragg grating 154', and also shows the single fiber Bragg grating 154' symmetrically arranged about the center of the tapered region defined by the recess 158', it should be understood that the relative locations of cladding material 156' and grating 154' may be varied, and that the location, shape and relative dimensions of recess 158' are shown for exemplary purposes only. It should be further understood that the thickness and spacing of grating 154' is shown for exemplary purposes only. How the grating is formed, particularly with regard to its relative dimensions, is dependent upon the particular manufacturing technique for forming the recess 158'. For example, if recess 158' is formed using chemical etching on the optical fiber core 152', the grating 154' can be directly formed using the intended final thickness and spacing. However, if the relatively thin central portion of recess 158' is formed using stretching of, for example, the melted silica of optical fiber core 152', then the initial grating will need to have a small spacing, as it will be stretched out to the final desired spacing during the stretching process.

Figure 4D:
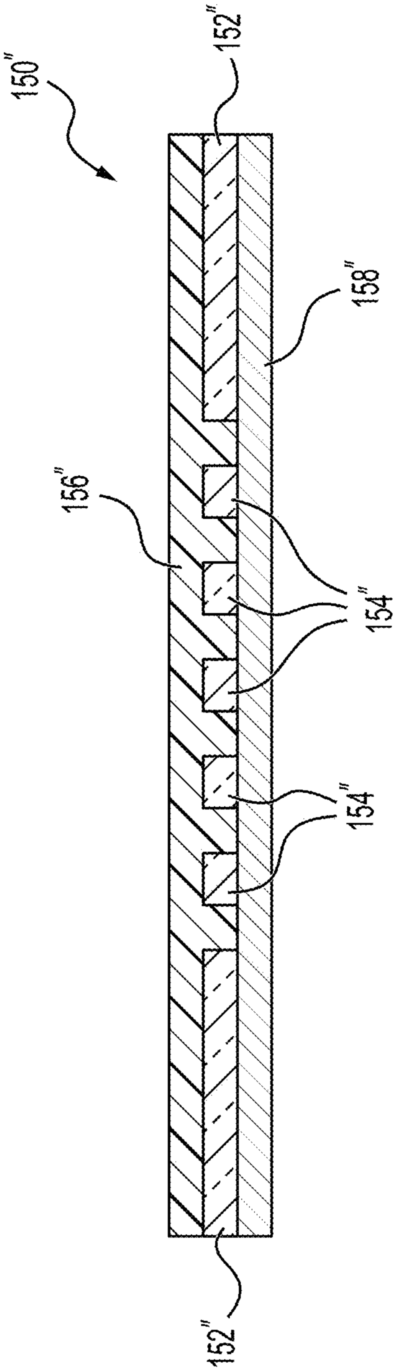
FIG. 4D is a side view in section of an alternative embodiment of the acoustically sensitive fiber Bragg grating of FIG. 1I.

Similar to FIG. 4C, FIG. 4D illustrates an acoustically sensitive fiber Bragg grating 150" formed as an "on chip" fiber Bragg grating, but with only a single fiber Bragg grating 154". Layer 152" is coated or otherwise deposited on a substrate 158", where layer 152" corresponds to an optical fiber core which may be silicon, silica or any other suitable material. The single fiber Bragg grating 154" is similarly coated or otherwise deposited on substrate 158". During manufacture, a layer of material 156" is deposited on the top of the structure such that it will cover and fill in the regions between the components. The material 156" corresponds to cladding material 56 in the embodiment of FIG. 1I.

It should be understood that the acoustically sensitive fiber Bragg gratings of FIGS. 4C and 4D may be manufactured using any suitable method. As a non-limiting example, in order to define the waveguide geometry, a lithography technique may be used, such as photolithography, which enables precise patterning of the photosensitive layer on the substrate, which may be, as further non-limiting examples, a silicon-on-insulator (SOI) semiconductor wafer or a flexible substrate, such as a polymer layer. Subsequently, etching processes, such as reactive ion etching (RIE) or wet etching, as non-limiting examples, may be employed to selectively remove the undesired material, leaving behind the waveguide structure. Once the waveguide is established, the next step is to introduce grating structures along its length. This can be achieved through various methods, such as by using DUV writing, as a non-limiting example, in which a focused ultraviolet (UV) laser beam is used to locally modify the refractive index of the photosensitive silica layer. By scanning the laser beam across the waveguide, periodic refractive index variations are created, forming the grating structure. Precise control over the scanning speed and intensity allows for the desired grating period and depth. To complete the fabrication process, the cladding layer is applied to the waveguide structure. As a non-limiting example, the thickness of the cladding material can range between tens of nanometers to tens of micrometers. The size of the waveguide's cross section (i.e., the height and width of the waveguide) must be controlled in order to ensure a sufficient portion of light in the polymer coating layer.

With regard to the tapering, as non-limiting examples, selective chemical etching, micro-polishing, or high-power femtosecond laser machining could be applied during formation of the waveguide layer, prior to the creation of the grating structures. These exemplary methods enable the precise shaping of the waveguide profile to achieve the desired taper. The waist diameter of the tapered waveguide (i.e., the smallest diameter along the waveguide) can be decreased to a few hundred nanometers, as a non-limiting example, in order to ensure a large portion of the light field in the polymer coating to increase the ultrasound sensitivity. The length of the tapered area could range, as a non-limiting example, from a few hundred micrometers to a few hundred millimeters.

Figure 5:
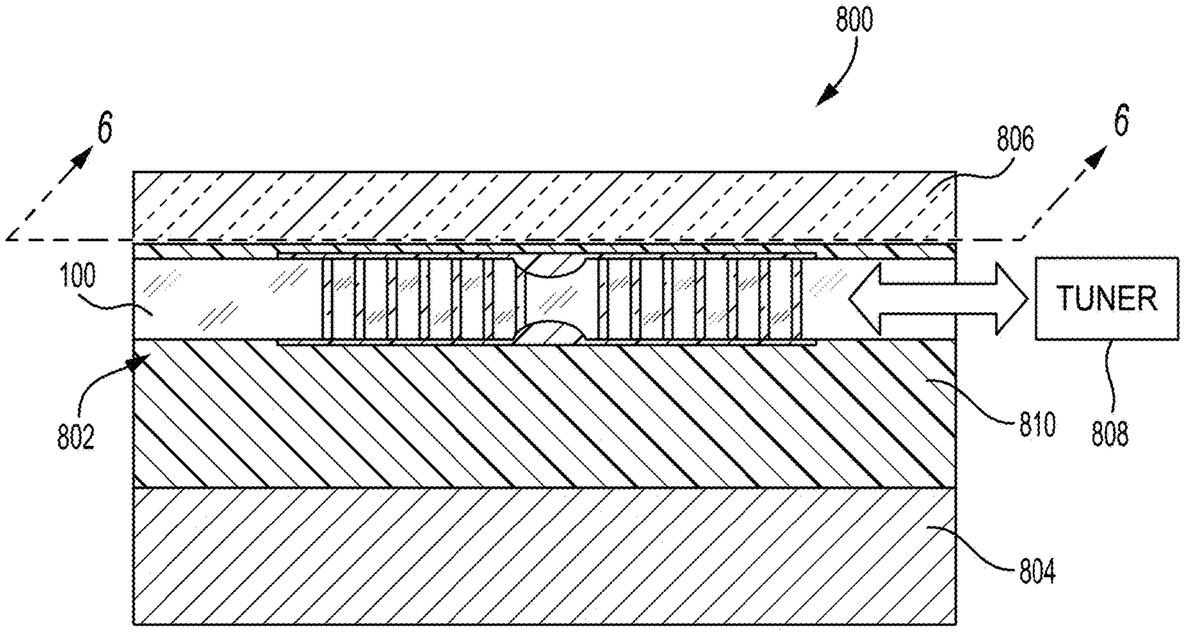
FIG. 5 is a side view in section of an ultrasound sensor.

As shown in FIG. 5, an ultrasound sensor 800 may include at least one of the optical fibers described above embedded in a polymer layer 810. Although FIG. 5 shows the optical fiber 100 of FIG. 1B, it should be understood that ultrasound sensor 800 may use any of the embodiments of the optical fiber with an acoustically sensitive fiber Bragg grating described above. The ultrasound sensor 800 also includes a backing layer 804 and an acoustic matching layer 806, as is well-known in the art, such that the polymer layer 810 and the at least one optical fiber 100 are sandwiched between the backing layer 804 and the acoustic matching layer 806. It should be understood that the acoustic matching layer 806 may be formed from any suitable type of material for achieving appropriate acoustic impedance to maximize ultrasound transmission through any additional components, such as, for example, an acoustic lens, additional sensors, etc. The acoustic matching layer 806 is selected for acoustic impedance matching with a target environment to reduce acoustic reflections at the interface between the array and target environment. Further, it should be understood that backing layer 804 may be formed from any suitable material to absorb back-propagated sound waves.

Figure 6:
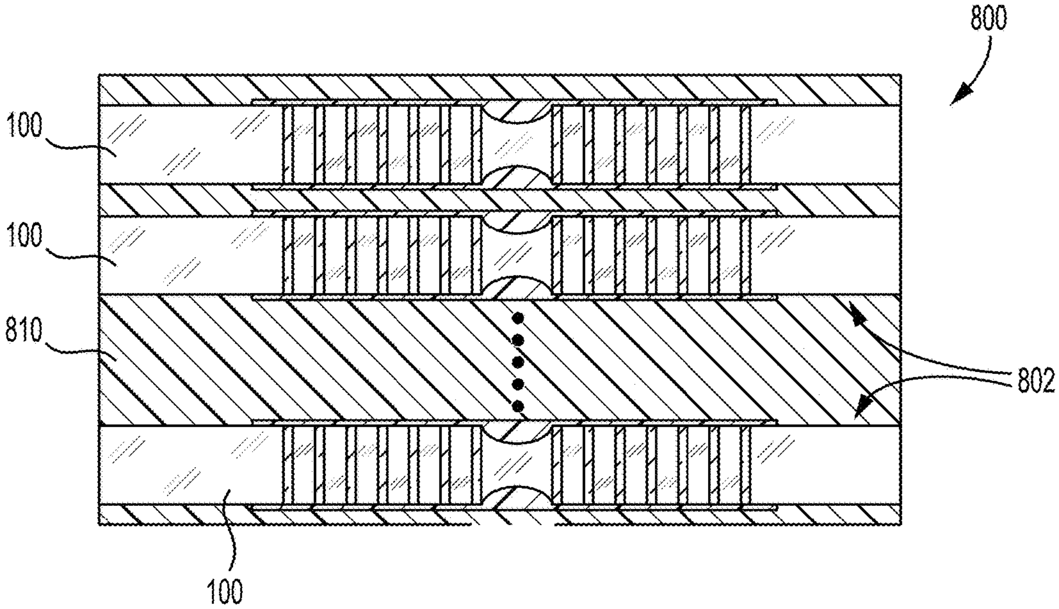
FIG. 6 is a cross-sectional view of the ultrasound sensor of FIG. 5, taken along cross-sectional cut lines 6-6 in FIG. 5.

As is also well-known in the art, a tuner 808 may be provided for tuning the response of the at least one optical fiber 100 through application of, for example, mechanical stress or heat. The polymer layer 810 may be selected such that it has a smaller refractive index than the refractive index of the cladding material 120 of optical fiber 100. As shown in FIG. 6, the at least one optical fiber 100 may be provided as a linear array 802 of optical fibers 100.

Figure 7:
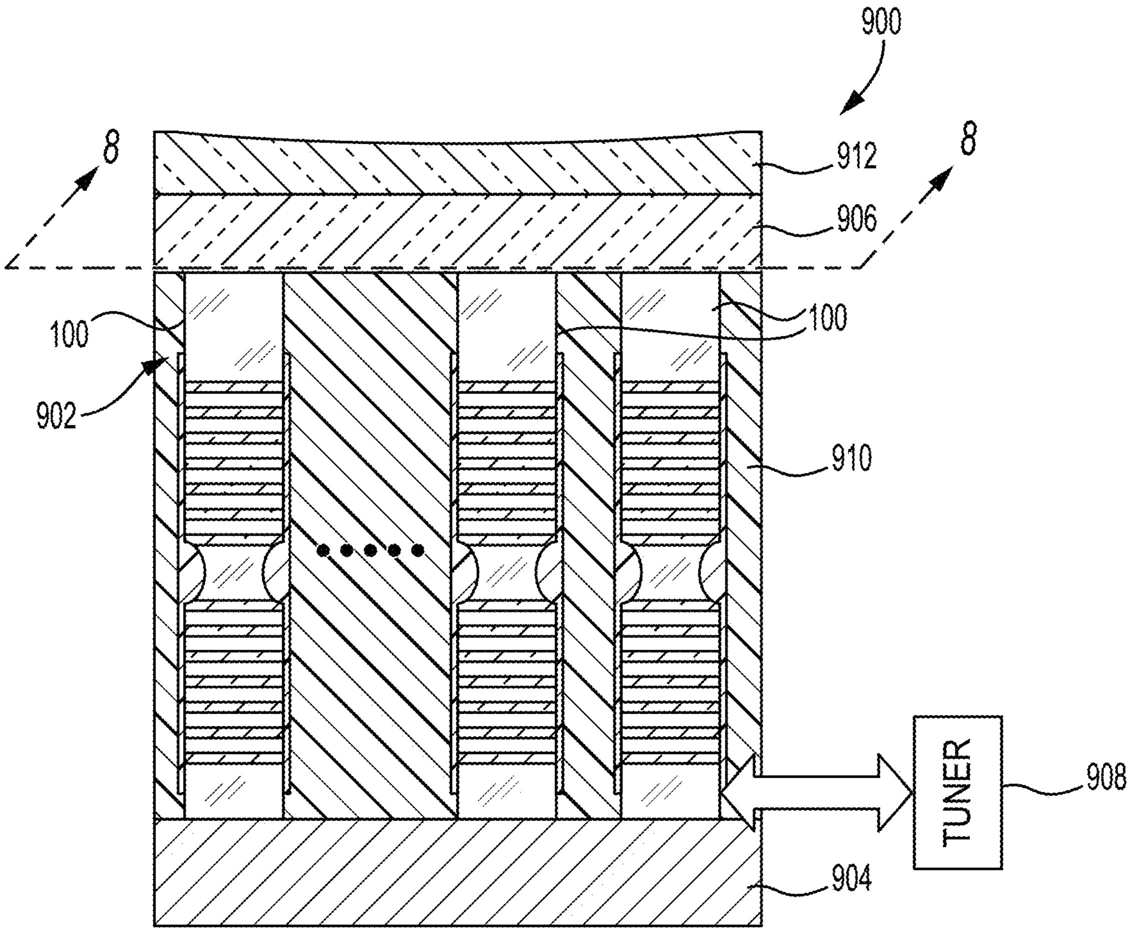
FIG. 7 is a side view in section of an alternative embodiment of the ultrasound sensor.
Figure 8:
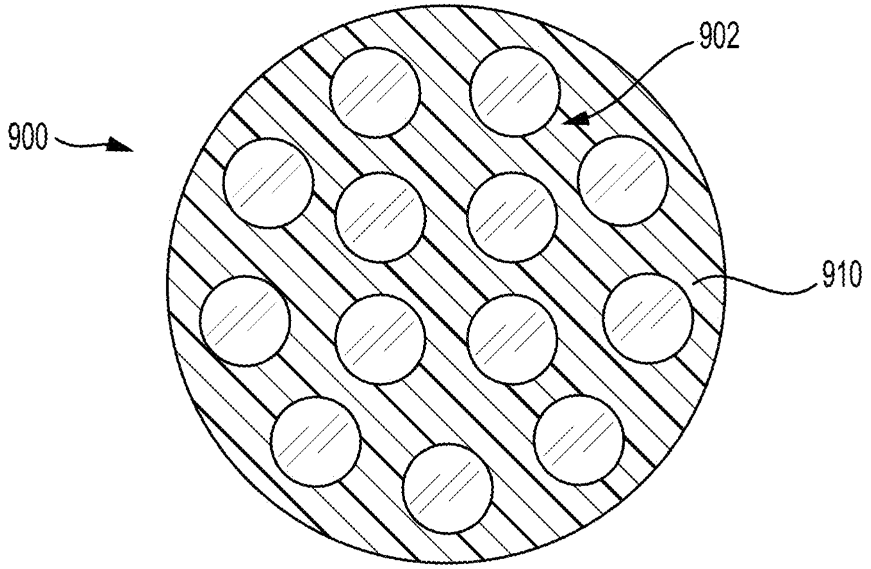
FIG. 8 is a cross-sectional view of the ultrasound sensor of FIG. 7, taken along cross-sectional cut lines 8-8 in FIG. 7.
Figure 9:
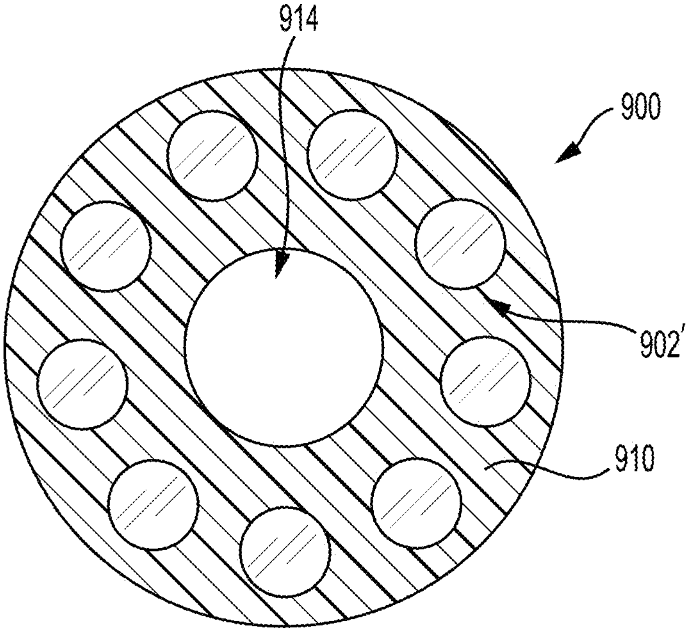
FIG. 9 is a top view in section of an alternative embodiment of the ultrasound sensor of FIG. 8.

In the alternative embodiment of FIGS. 7 and 8, the ultrasound sensor 900 similarly includes an array 902 of any of the optical fibers described above embedded in a polymer layer 910. The polymer layer 910 and the array 902 are sandwiched between a backing layer 904 and an acoustic matching layer 906. As in the previous embodiment, a tuner 908 may be employed for tuning the array 902. However, in FIGS. 7 and 8, array 902 is a cylindrically distributed array within the polymer layer 910. As a further alternative, as shown in FIG. 9, the cylindrically distributed array of the optical fibers 902' may be circumferentially distributed and may further surround a central axial opening or space 914. As shown in FIG. 7, an acoustic lens 912 may be positioned adjacent to the acoustic matching layer 906, as is well-known in the art.

Figure 10A:
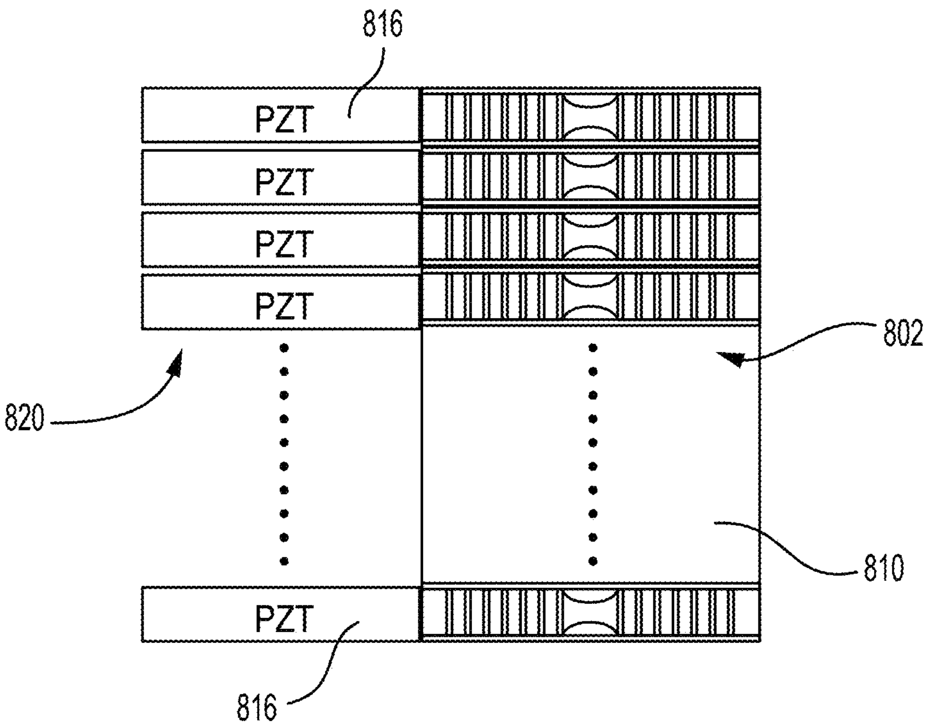
FIG. 10A partially diagrammatically illustrates another alternative embodiment of the ultrasound sensor.
Figure 10B:
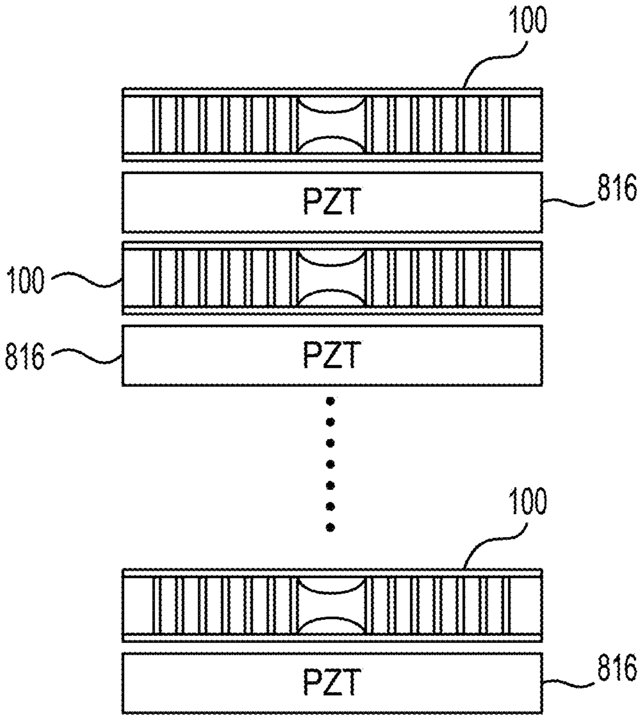
FIG. 10B partially diagrammatically illustrates still another alternative embodiment of the ultrasound sensor.
Figure 11:
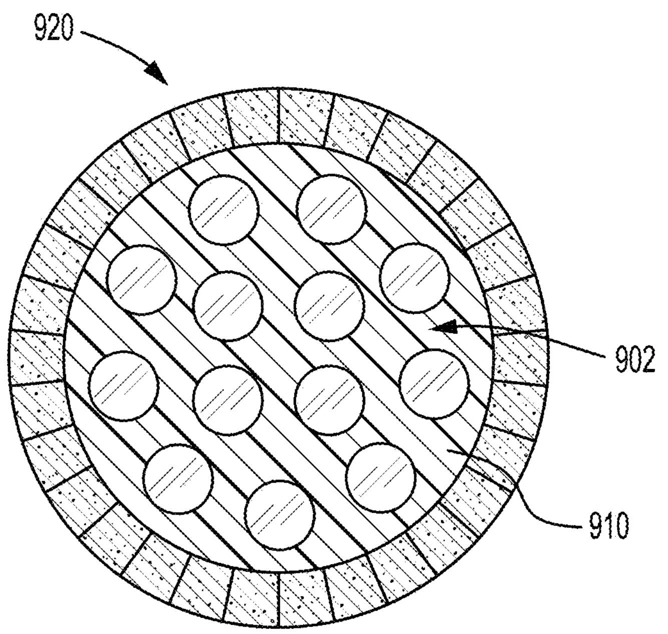
FIG. 11 is a top view in section of another alternative embodiment of the ultrasound sensor.

As shown in FIG. 10A, at least one piezoelectric transducer 816, or any other suitable type of acoustic energy generating (AEG) transducer, may be positioned adjacent to the at least one optical fiber 100 in the ultrasound sensor 800/900. In FIG. 10A, the at least one piezoelectric transducer 816 is shown as a linear array 820 of piezoelectric transducers, each mounted to one end of a corresponding one of the optical fibers of array 802. FIG. 10B illustrates an alternative configuration, where piezoelectric transducers 816 alternate with optical fibers 100. As a further alternative, as shown in FIG. 11, the at least one optical fiber may be provided as a cylindrically distributed array 902 (similar to the embodiment of FIG. 8), and the at least one piezoelectric transducer may be provided as an array 920 of piezoelectric transducers annularly surrounding the cylindrically distributed array 902 of the optical fibers and the polymer layer 910.

Figure 12:
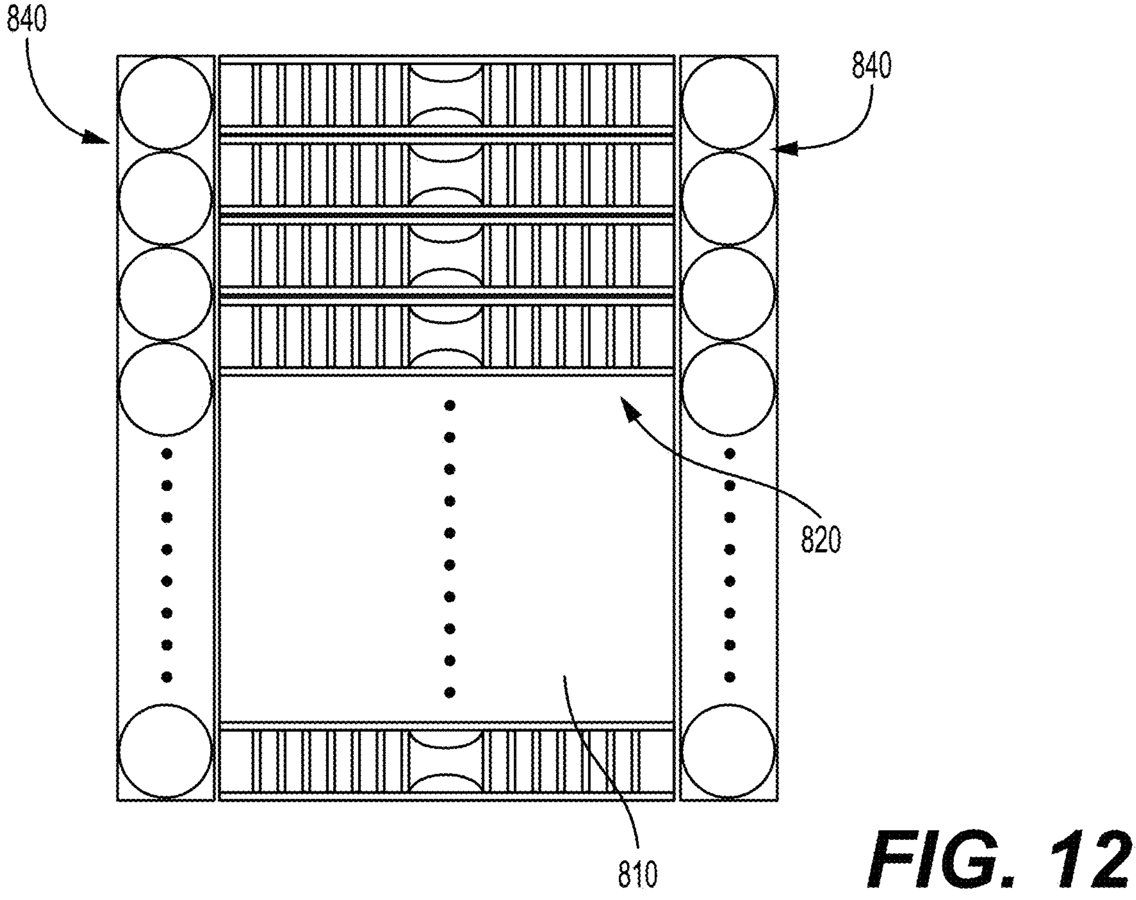
FIG. 12 partially diagrammatically illustrates another alternative embodiment of the ultrasound sensor.
Figure 13A:
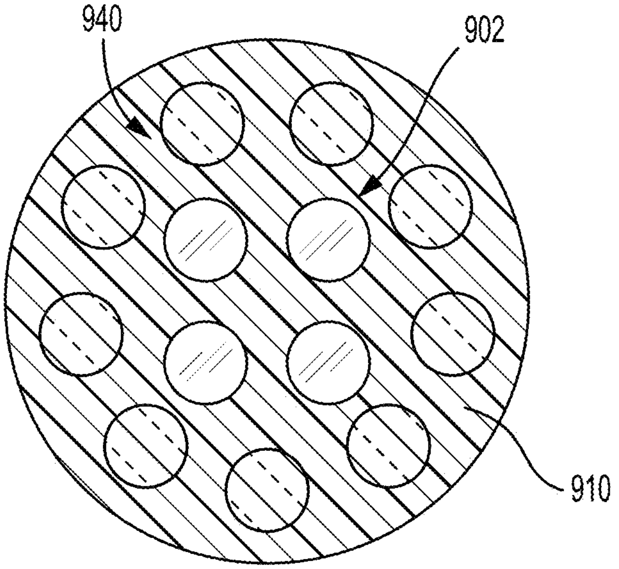
FIG. 13A is a top view in section illustrating another alternative embodiment of the ultrasound sensor.
Figure 13B:
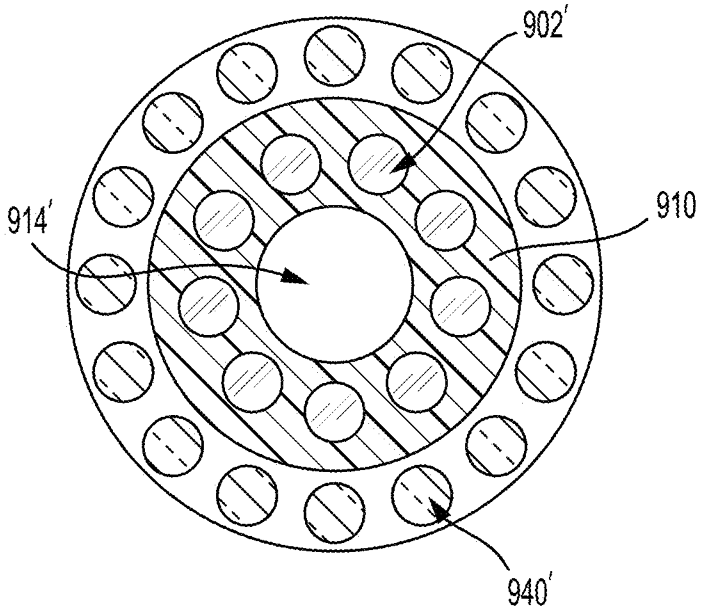
FIG. 13B is a top view in section illustrating still another alternative embodiment of the ultrasound sensor.

In another alternative embodiment, as shown in FIG. 12, at least one array of photoacoustic fiber bundles 840 may be positioned adjacent to the at least one optical fiber (shown as an array 820 of optical fibers in the non-limiting example of FIG. 12) for an all optical ultrasound imaging platform in which ultrasound is generated and received optically. In FIG. 12, the array 820 is shown as a linear array. However, as shown in FIG. 13, the at least one optical fiber may be provided as a cylindrically distributed array 902 (similar to the embodiment of FIG. 8), and an array of photoacoustic fiber bundles 940 may be embedded in the polymer layer. As a further alternative, as shown in FIG. 13B, the array of the optical fibers 902' and the array of photoacoustic fiber bundles 940' may each be circumferentially distributed. As shown, the arrays 902' and 940' may be coaxial with a central axial opening or space 914'.

Figure 14:
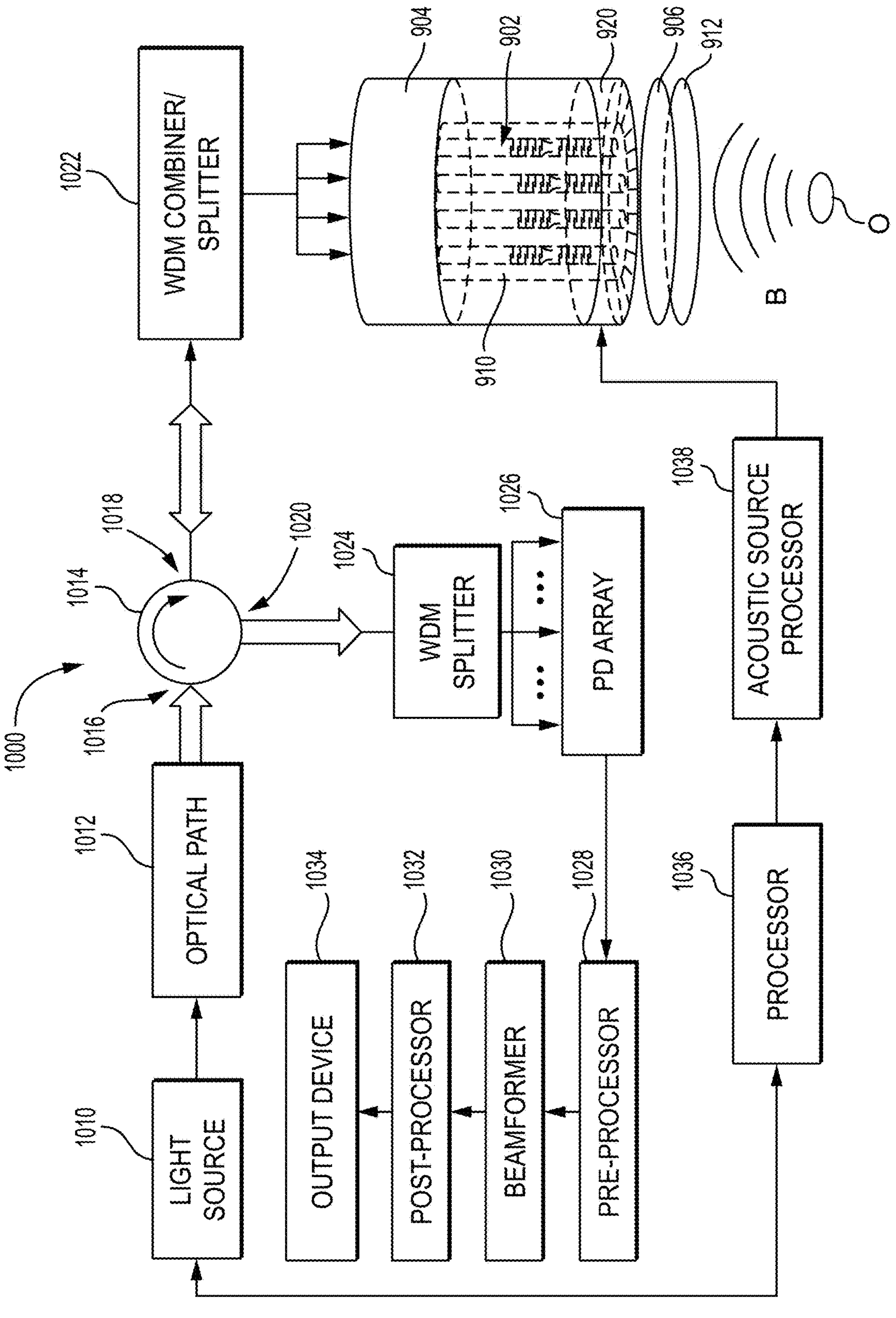
FIG. 14 is a block diagram showing system components for an ultrasound backscattering sensor.

FIG. 14 shows the acoustic sensor 900 integrated into a full acoustic backscattering sensor system 1000, although it should be understood that system 1000 may be used with any of the embodiments of the acoustic sensor described above. As shown, a light source 1010 is provided for producing an initial light beam having a plurality of wavelengths associated therewith, such as a broadband laser system or the like. The multi-wavelength light beam is coupled to an optical circulator 1014 through optical path 1012. The optical circulator is provided with first, second and third ports 1016, 1018 and 1020, respectively, where the first port 1016 is in optical communication with the light source 1010 through optical path 1012. The acoustic backscattering sensor system 1000 may further include a first wavelength division multiplexing (WDM) splitter 1022 in optical communication with the second port 1018 of the optical circulator 1014 for dividing the initial light beam into optical signals each having one of the wavelengths associated therewith.

The first wavelength division multiplexing splitter 1022 is in optical communication with the array 902 of the optical fibers for respectively transmitting the optical signals thereto. Additionally, a wavelength division multiplexing combiner may be in optical communication with the array 902 of the optical fibers for receiving sensed signals therefrom for combining the sensed signals into a sensed light beam. In FIG. 14, the first wavelength division multiplexing splitter and the wavelength division multiplexing combiner are shown integrated into a single unit 1022, however, it should be understood that these may also be provided as separate components. The array 920 of piezoelectric or acoustic energy generating transducers is actuated by processor 1036, either alone or in conjunction with a separate acoustic source processor 1038, to generate an acoustic signal directed at an object O to be imaged. The array 902 of the optical fibers senses the acoustic signal B, and the sensed signals which are combined into the sensed light beam are representative of acoustic signal B.

The wavelength division multiplexing combiner 1022 is in optical communication with the second port 1018 of the optical circulator 1014. A second wavelength division multiplexing splitter 1024 may be in optical communication with the third port 1020 of the optical circulator 1014 for receiving the initial light beam and the sensed light beam and dividing each into individual wavelength components. A photodetector array 1026 may be in optical communication with the second wavelength division multiplexing splitter 1024 for receiving the individual wavelength components of the sensed light beam, such that detected phase shifts therebetween are indicative of sensed acoustic signals. In order to convert these detected phase shifts into an image and/or data representative of the structure of object O, the signals may undergo pre-processing, beamforming and post-processing, as is conventionally known. Although FIG. 14 shows pre-processor 1028, beamformer 1030, post-processor 1032 and processor 1036 as separate components, it should be understood that two or more of these components may be incorporated into a single processor, controller, computer or the like. The image and/or data representative of the structure of object O is then displayed to the user on output device 1034, which may be a computer display or the like.

Another innovation is to assemble the single FBG sensors into sensor arrays. The FBG sensors can be assembled into a linear array or a two-dimensional (2D) array, such as those discussed above with regard to FIGS. 6-8. In a linear array probe, the FBG elements are aligned in a plane along their transverse direction. These FBG elements are embedded into a polymer block and stacked on a backing material with high acoustic attenuation to avoid any back reflections. Matching layers and acoustic lenses are positioned on top of the FBG elements to help transfer the ultrasound energy from the medium to the sensing elements.

It is to be understood that the acoustically sensitive fiber Bragg grating and the ultrasound sensor including the same are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. An optical fiber with an acoustically sensitive fiber Bragg grating, comprising:

an optical fiber core, wherein a fiber Bragg grating is formed in the optical fiber core; and a cladding material disposed on and surrounding at least a portion of the optical fiber core, wherein the cladding material has at least one material property associated therewith, the at least one material property being selected from the group consisting of a smaller Young's modulus than a Young's modulus of the optical fiber core, a larger photo-elastic coefficient than a photo-elastic coefficient of the optical fiber core, and combinations thereof.

2. The optical fiber with an acoustically sensitive fiber Bragg grating as recited in claim 1, wherein a region of the optical fiber core has a diameter which is less than a diameter of a remainder of the optical fiber core.

3. The optical fiber with an acoustically sensitive fiber Bragg grating as recited in claim 2, wherein a recess is formed in an outer surface of the optical fiber core, and wherein the cladding material fills the recess.

4. The optical fiber with an acoustically sensitive fiber Bragg grating as recited in claim 3, wherein the recess is an annular recess.

5. The optical fiber with an acoustically sensitive fiber Bragg grating as recited in claim 1, wherein the cladding material is selected from the group consisting of polyvinylidene fluoride, polystyrene, parylene, and benzocyclobutene.

6. The optical fiber with an acoustically sensitive fiber Bragg grating as recited in claim 1, further comprising a reflector formed in the optical fiber core, the reflector being spaced apart from the fiber Bragg grating.

7. The optical fiber with an acoustically sensitive fiber Bragg grating as recited in claim 6, wherein a region of the optical fiber core between the fiber Bragg grating and the reflector has a diameter which is less than a diameter of a remainder of the optical fiber core.

8. The optical fiber with an acoustically sensitive fiber Bragg grating as recited in claim 7, wherein a recess is formed in an outer surface of the optical fiber core, the recess being aligned with the region of the optical fiber core between the fiber Bragg grating and the reflector, and wherein the cladding material fills the recess.

9. The optical fiber with an acoustically sensitive fiber Bragg grating as recited in claim 8, wherein the recess is an annular recess.

10. The optical fiber with an acoustically sensitive fiber Bragg grating as recited in claim 6, wherein a region between the fiber Bragg grating and the reflector is at least partially filled with the cladding material.

11. The optical fiber with an acoustically sensitive fiber Bragg grating as recited in claim 10, wherein the region between the fiber Bragg grating and the reflector which is at least partially filled with the cladding material has a diameter which is less than a diameter of the optical fiber core.

12. The optical fiber with an acoustically sensitive fiber Bragg grating as recited in claim 11, wherein a recess is formed in an outer portion of the region between the fiber Bragg grating and the reflector which is at least partially filled with the cladding material, and wherein a secondary cladding material fills the recess, the secondary cladding material having a smaller refractive index than the refractive index of the cladding material.

13. The optical fiber with an acoustically sensitive fiber Bragg grating as recited in claim 10, wherein the region between the fiber Bragg grating and the reflector which is at least partially filled with the cladding material has a diameter which is greater than a diameter of the optical fiber core.

14. The optical fiber with an acoustically sensitive fiber Bragg grating as recited in claim 10, wherein the region between the fiber Bragg grating and the reflector which is at least partially filled with the cladding material is defined by a pair of convex surfaces respectively facing the fiber Bragg grating and the reflector.

15. The optical fiber with an acoustically sensitive fiber Bragg grating as recited in claim 10, wherein the region between the fiber Bragg grating and the reflector which is at least partially filled with the cladding material is defined by a concave surface facing one of the fiber Bragg grating and the reflector and a convex surface facing the other of the fiber Bragg grating and the reflector.

16. The optical fiber with an acoustically sensitive fiber Bragg grating as recited in claim 10, wherein the region between the fiber Bragg grating and the reflector which is at least partially filled with the cladding material is defined by a planar surface facing one of the fiber Bragg grating and the reflector and a convex surface facing the other of the fiber Bragg grating and the reflector.

17. The optical fiber with an acoustically sensitive fiber Bragg grating as recited in claim 6, wherein the cladding material is selected from the group consisting of polyvinylidene fluoride, polystyrene, parylene, and benzocyclobutene.

18. The optical fiber with an acoustically sensitive fiber Bragg grating as recited in claim 6, wherein the reflector is selected from the group consisting of a mirror and another fiber Bragg grating.

19. An ultrasound sensor, comprising:

at least one optical fiber embedded in a polymer layer;

a fiber Bragg grating and a reflector formed in an optical fiber core of the at least one optical fiber, wherein the fiber Bragg grating and the reflector are spaced apart from one another;

a cladding material disposed on and surrounding at least a portion of the optical fiber core, wherein the cladding material has at least one material property associated therewith, the at least one material property being selected from the group consisting of a smaller Young's modulus than a Young's modulus of the optical fiber core, a larger photo-elastic coefficient than a photo-elastic coefficient of the optical fiber core, and combinations thereof;

a backing layer; and an acoustic matching layer, wherein the polymer layer and the at least one optical fiber are sandwiched between the backing layer and the acoustic matching layer.

20. The ultrasound sensor as recited in claim 19, wherein the at least one optical fiber comprises a linear array of the optical fibers.

21. The ultrasound sensor as recited in claim 20, wherein the at least one optical fiber comprises a cylindrically distributed array of the optical fibers within the polymer layer.

22. The ultrasound sensor as recited in claim 21, wherein the cylindrically distributed array of the optical fibers are circumferentially distributed.

23. The ultrasound sensor as recited in claim 19, further comprising at least one acoustic energy generating transducer positioned adjacent to the at least one optical fiber.

24. The ultrasound sensor as recited in claim 23, wherein the at least one optical fiber comprises a cylindrically distributed array of the optical fibers, and wherein the at least one acoustic energy generating transducer comprises an array of the acoustic energy generating transducers annularly surrounding the cylindrically distributed array of the optical fibers and the polymer layer.

25. The ultrasound sensor as recited in claim 19, further comprising at least one array of photoacoustic fiber bundles positioned adjacent to the at least one optical fiber.

26. The ultrasound sensor as recited in claim 19, further comprising an array of photoacoustic fiber bundles embedded in the polymer layer.

27. The ultrasound sensor as recited in claim 26, wherein the at least one optical fiber comprises array of the optical fibers, and wherein the array of photoacoustic fiber bundles and the array of the optical fibers are each cylindrically distributed within the polymer layer.

28. The ultrasound sensor as recited in claim 27, wherein the array of the optical fibers and the array of photoacoustic fiber bundles are each circumferentially distributed.

29. The ultrasound sensor as recited in claim 19, further comprising:

a light source for producing an initial light beam having a plurality of wavelengths associated therewith;

an optical circulator having first, second and third ports, the first port being in optical communication with the light source;

a first wavelength division multiplexing splitter in optical communication with the second port of the optical circulator, the first wavelength division multiplexing splitter dividing the initial light beam into optical signals each having one of the wavelengths associated therewith, wherein the at least one optical fiber comprises an array of the optical fibers, and wherein the first wavelength division multiplexing splitter is in optical communication with the array of the optical fibers for respectively transmitting the optical signals thereto;

a wavelength division multiplexing combiner in optical communication with the array of the optical fibers for receiving sensed signals therefrom, the wavelength division multiplexing combiner combining the sensed signals into a sensed light beam, the wavelength division multiplexing combiner being in optical communication with the second port of the optical circulator;

a second wavelength division multiplexing splitter in optical communication with the third port of the optical circulator for receiving the initial light beam and the sensed light beam and dividing each into individual wavelength components; and a photodetector array in optical communication with the second wavelength division multiplexing splitter for receiving the individual wavelength components of the sensed light beam, wherein detected phase shifts are indicative of sensed acoustic signals.

30. The ultrasound sensor as recited in claim 29, further comprising at least one acoustic energy generating transducer positioned adjacent to an array of the optical fibers.

31. The ultrasound sensor as recited in claim 30, wherein the array of the optical fibers comprises a cylindrically distributed array of the optical fibers, and wherein the at least one acoustic energy generating transducer comprises an array of acoustic energy generating transducers annularly surrounding the array of the optical fibers and the polymer layer.

32. The ultrasound sensor as recited in claim 31, further comprising an acoustic lens positioned adjacent to the acoustic matching layer.

33. The ultrasound sensor as recited in claim 19, wherein the reflector of the at least one optical fiber is selected from the group consisting of a mirror and another fiber Bragg grating.

34. An optical chip with an acoustically sensitive fiber Bragg grating, comprising:

a substrate;

an optically transparent layer formed on the substrate, wherein the optically transparent layer defines a core region, and wherein a fiber Bragg grating and a reflector are formed in the core region, the fiber Bragg grating and the reflector being spaced apart from one another; and a cladding material disposed on and surrounding at least a portion of the core region such that the core region is at least partially sandwiched between the cladding material and the substrate, wherein the cladding material has at least one material property associated therewith, the at least one material property being selected from the group consisting of a smaller Young's modulus than a Young's modulus of the core region, a larger photo-elastic coefficient than a photo-elastic coefficient of the core region, and combinations thereof.

35. The optical chip with an acoustically sensitive fiber Bragg grating as recited in claim 34, wherein a portion of the core region between the fiber Bragg grating and the reflector has a width which is less than a width of a remainder of the core region.

36. The optical chip with an acoustically sensitive fiber Bragg grating as recited in claim 35, wherein a recess is formed in at least one outer edge of the core region, the recess being aligned with the portion of the core region between the fiber Bragg grating and the reflector, and wherein the cladding material fills the recess.

37. The optical chip with an acoustically sensitive fiber Bragg grating as recited in claim 34, wherein a region between the fiber Bragg grating and the reflector is at least partially filled with the cladding material.

38. The optical chip with an acoustically sensitive fiber Bragg grating as recited in claim 37, wherein the region between the fiber Bragg grating and the reflector which is at least partially filled with the cladding material has a width which is less than a width of the core region.

39. The optical chip with an acoustically sensitive fiber Bragg grating as recited in claim 38, wherein a recess is formed in at least one outer edge of the region between the fiber Bragg grating and the reflector which is at least partially filled with the cladding material, and wherein a secondary cladding material fills the recess, the secondary cladding material having a smaller refractive index than the refractive index of the cladding material.

40. The optical chip with an acoustically sensitive fiber Bragg grating as recited in claim 37, wherein the region between the fiber Bragg grating and the reflector which is at least partially filled with the cladding material has a width which is greater than a width of the core region.

41. The optical chip with an acoustically sensitive fiber Bragg grating as recited in claim 37, wherein the region between the fiber Bragg grating and the reflector which is at least partially filled with the cladding material is defined by a pair of convex surfaces respectively facing the fiber Bragg grating and the reflector.

42. The optical chip with an acoustically sensitive fiber Bragg grating as recited in claim 37, wherein the region between the fiber Bragg grating and the reflector which is at least partially filled with the cladding material is defined by a concave surface facing one of the fiber Bragg grating and the reflector and a convex surface facing the other of the fiber Bragg grating and the reflector.

43. The optical chip with an acoustically sensitive fiber Bragg grating as recited in claim 37, wherein the region between the fiber Bragg grating and the reflector which is at least partially filled with the cladding material is defined by a planar surface facing one of the fiber Bragg grating and the reflector and a convex surface facing the other of the fiber Bragg grating and the reflector.

44. The optical chip with an acoustically sensitive fiber Bragg grating as recited in claim 34, wherein the cladding material is selected from the group consisting of polyvinylidene fluoride, polystyrene, parylene, and benzocyclobutene.

45. The optical chip with an acoustically sensitive fiber Bragg grating as recited in claim 34, wherein the reflector is selected from the group consisting of a mirror and another fiber Bragg grating.

* * * * *